US012105210B2

(12) United States Patent
Gum et al.

(10) Patent No.: US 12,105,210 B2
(45) Date of Patent: Oct. 1, 2024

(54) ACCURACY-BASED GNSS BAND SELECTION

(71) Applicant: QUALCOMM Incorporated, San Diego, CA (US)

(72) Inventors: Arnold Jason Gum, San Diego, CA (US); Deepika Srinivasan, San Jose, CA (US); Bala Ramasamy, San Marcos, CA (US); Krishnaranjan Rao, Sunnyvale, CA (US); Jeffrey Wong, Saratoga, CA (US); Jordan Cookman, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 191 days.

(21) Appl. No.: 17/811,850

(22) Filed: Jul. 11, 2022

(65) Prior Publication Data
US 2024/0012157 A1   Jan. 11, 2024

(51) Int. Cl.
*G01S 19/40*   (2010.01)
*G01S 19/24*   (2010.01)
(Continued)

(52) U.S. Cl.
CPC .............. *G01S 19/40* (2013.01); *G01S 19/24* (2013.01); *G01S 19/33* (2013.01); *G01S 19/396* (2019.08)

(58) Field of Classification Search
CPC ........ G01S 19/40; G01S 19/396; G01S 19/24; G01S 19/33
(Continued)

(56) References Cited

U.S. PATENT DOCUMENTS

2013/0099965 A1\* 4/2013 Sairo ..................... G01S 5/0036
                                                                 342/357.42
2019/0235088 A1\* 8/2019 Tanaka ................. G01C 21/165
(Continued)

FOREIGN PATENT DOCUMENTS

CN       102077112 A  \*  5/2011  ............. G01S 19/03
CN       111913201 A       11/2020
(Continued)

OTHER PUBLICATIONS

International Search Report and Written Opinion—PCT/US2023/023158—ISA/EPO—Sep. 12, 2023.

*Primary Examiner* — Harry K Liu
(74) *Attorney, Agent, or Firm* — Thien T. Nguyen

(57) ABSTRACT

In some implementations, an apparatus may receive a request for the Global Navigation Satellite System (GNSS) position fix information. The request may include an accuracy requirement. The apparatus may determine a set of GNSS bands to use to determine the GNSS position fix information. The set of GNSS bands may comprise one or more bands from a plurality of available GNSS bands, and determining the set of GNSS bands to use may be based at least in part on the accuracy requirement. The apparatus may determine the GNSS position fix information based at least in part on GNSS signals received via the selected set of GNSS bands. The apparatus may provide the GNSS position fix information (e.g., to an application processor). The GNSS position fix information may comprise a GNSS position fix, pseudorange information, or both.

45 Claims, 10 Drawing Sheets

(51) Int. Cl.
*G01S 19/33* (2010.01)
*G01S 19/39* (2010.01)

(58) Field of Classification Search
USPC .......................................................... 342/352
See application file for complete search history.

(56) References Cited

U.S. PATENT DOCUMENTS

| | | |
|---|---|---|
| 2020/0100121 A1 | 3/2020 | Cookman et al. |
| 2021/0055425 A1 | 2/2021 | Guo et al. |
| 2021/0096266 A1 | 4/2021 | Knutson et al. |
| 2022/0085945 A1 | 3/2022 | Manolakos et al. |
| 2022/0137234 A1* | 5/2022 | Syrjärinne .............. G01S 19/32 |
| | | 342/357.61 |

FOREIGN PATENT DOCUMENTS

| | | | |
|---|---|---|---|
| TW | 202219548 A * | 5/2022 | ............. G01S 19/21 |
| WO | 2021229886 A1 | 11/2021 | |
| WO | 2022046359 A1 | 3/2022 | |
| WO | WO-2022084401 A2 * | 4/2022 | ............. G01S 19/08 |

* cited by examiner

ACCURACY-BASED GNSS BAND SELECTION

BACKGROUND

Modern electronic devices frequently include systems that can receive signals from at least one satellite navigation system, commonly referred to as a Global Navigation Satellite System (GNSS), and use those signals to determine the location of the device, as well as other information such as speed, heading, altitude, etc. Such GNSS receivers may be integrated into consumer electronic devices, such as smartphones or smartwatches, as well as into navigation systems in different types of vehicles, including cars, trucks, ships, and aircraft. Signals are received by GNSS receivers from multiple satellites orbiting the earth and processed to determine the GNSS receiver's location and, by proxy, the location of the device, vehicle, etc. However, GNSS receivers can often use a relatively large amount of power for location determination.

BRIEF SUMMARY

Embodiments disclosed herein provide for adaptive GNSS band selection based on a desired accuracy. In particular, an application processor may include an accuracy requirement in a GNSS positioning fix information request to a GNSS receiver. The GNSS receiver may use the accuracy requirement to determine which GNSS band(s) to use when determining the GNSS positioning fix information. The GNSS receiver may also power down or power off RF components related to unused GNSS bands, thereby allowing for power savings.

An example method of providing Global Navigation Satellite System (GNSS) position fix information, according to this disclosure, may comprise receiving a request for the GNSS position fix information, wherein the request includes an accuracy requirement. The method also may comprise determining, from a plurality of GNSS bands available to a GNSS receiver, a set of GNSS bands to use to determine the GNSS position fix information based at least in part on the accuracy requirement. The method also may comprise determining the GNSS position fix information based at least in part on GNSS signals received via the set of GNSS bands. The method also may comprise providing the GNSS position fix information, wherein the GNSS position fix information comprises a GNSS position fix, pseudorange information, or both.

An example apparatus for providing Global Navigation Satellite System (GNSS) position fix information, according to this disclosure, may comprise a data communication interface, a memory, one or more processors communicatively coupled with the data communication interface and the memory, wherein the one or more processors are configured to receive, via the data communication interface, a request for the GNSS position fix information, wherein the request includes an accuracy requirement. The one or more processors further may be configured to determine, from a plurality of GNSS bands available to a GNSS receiver, a set of GNSS bands to use to determine the GNSS position fix information based at least in part on the accuracy requirement. The one or more processors further may be configured to determine the GNSS position fix information based at least in part on GNSS signals received via the set of GNSS bands. The one or more processors further may be configured to provide the GNSS position fix information with the data communication interface, wherein the GNSS position fix information comprises a GNSS position fix, pseudorange information, or both.

An example apparatus for providing Global Navigation Satellite System (GNSS) position fix information, according to this disclosure, may comprise means for receiving, at the apparatus, a request for the GNSS position fix information, wherein the request includes an accuracy requirement. The apparatus further may comprise means for determining, from a plurality of GNSS bands available to the apparatus, a set of GNSS bands to use to determine the GNSS position fix information based at least in part on the accuracy requirement. The apparatus further may comprise means for determining the GNSS position fix information based at least in part on GNSS signals received via the set of GNSS bands. The apparatus further may comprise means for providing the GNSS position fix information, wherein the GNSS position fix information comprising a GNSS position fix, pseudorange information, or both.

According to this disclosure, an example non-transitory computer-readable medium stores instructions for providing Global Navigation Satellite System (GNSS) position fix information, the instructions comprising code for receiving a request for the GNSS position fix information, wherein the request includes an accuracy requirement. The instructions further may comprise code for determine, from a plurality of GNSS bands available to a GNSS receiver, a set of GNSS bands to use to determine the GNSS position fix information based at least in part on the accuracy requirement. The instructions further may comprise code for determining the GNSS position fix information based at least in part on GNSS signals received via the set of GNSS bands. The instructions further may comprise code for providing the GNSS position fix information, wherein the GNSS position fix information comprising a GNSS position fix, pseudorange information, or both.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

Figure 1:
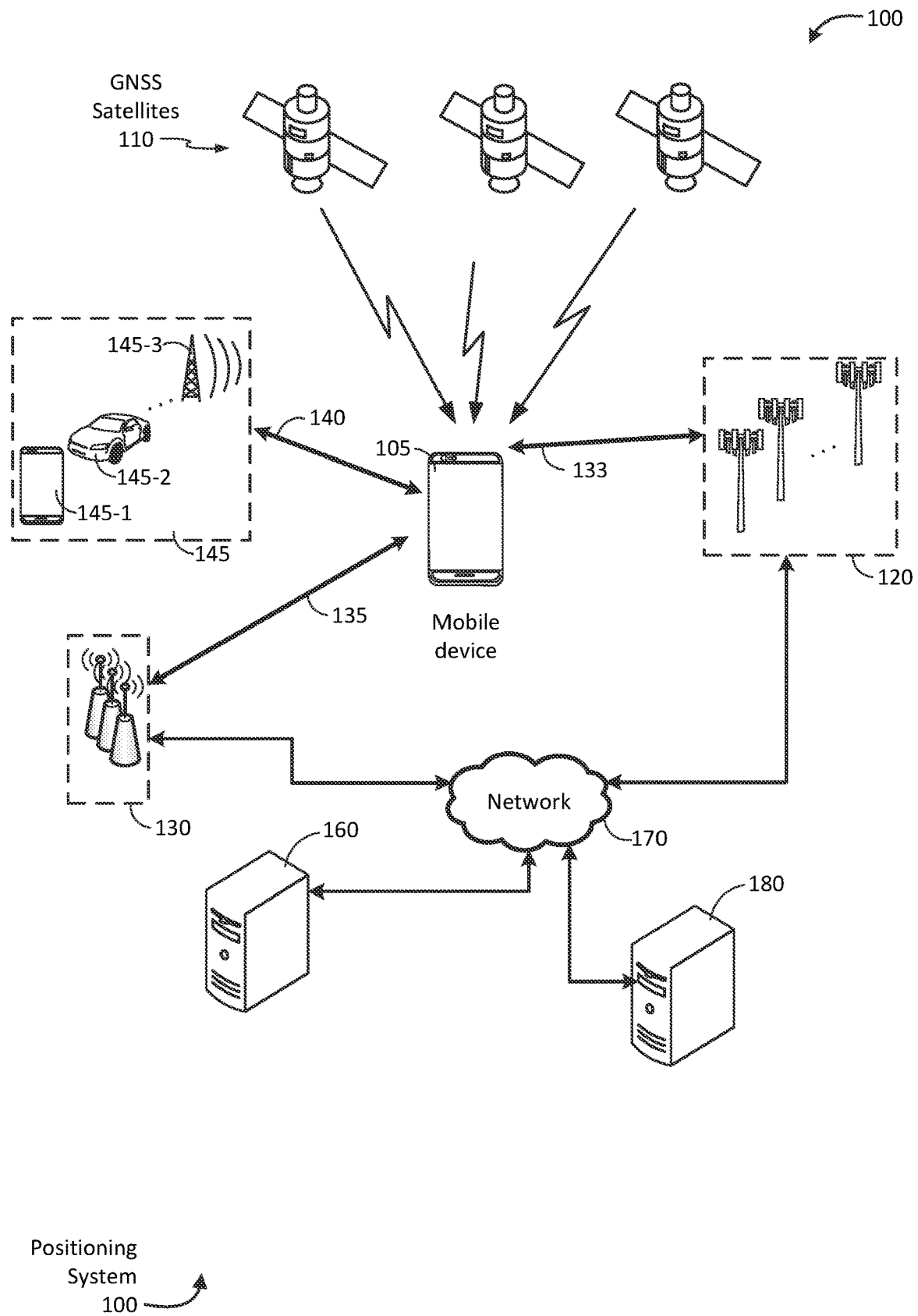
FIG. 1 is a diagram of a positioning system, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

Several illustrative examples will now be described with respect to the accompanying drawings, which form a part hereof. While particular examples, in which one or more aspects of the disclosure may be implemented, are described below, other examples may be used and various modifications may be made without departing from the scope of the disclosure or the spirit of the appended claims.

Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples.

The methodologies described herein may be implemented by various means depending upon applications according to particular examples. For example, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

As used herein, the terms "mobile device" and "User Equipment" (UE) may be used interchangeably and are not intended to be specific or otherwise limited to any particular Radio Access Technology (RAT), unless otherwise noted. In general, a mobile device and/or UE may be any wireless communication device (e.g., a mobile phone, router, tablet computer, laptop computer, tracking device, wearable (e.g., smartwatch, glasses, Augmented Reality (AR)/Virtual Reality (VR) headset, etc.), vehicle (e.g., automobile, vessel, aircraft motorcycle, bicycle, etc.), Internet of Things (IoT) device, etc.), or other electronic device that may be used for Global Navigation Satellite Systems (GNSS) positioning as described herein. According to some embodiments, a mobile device and/or UE may be used to communicate over a wireless communications network. A UE may be mobile or may (e.g., at certain times) be stationary, and may communicate with a Radio Access Network (RAN). As used herein, the term UE may be referred to interchangeably as an Access Terminal (AT), a client device, a wireless device, a subscriber device, a subscriber terminal, a subscriber station, a user terminal (UT), a mobile device, a mobile terminal, a mobile station, or variations thereof. Generally, UEs can communicate with a core network via a RAN, and through the core network, the UEs can be connected with external networks (such as the Internet) and with other UEs. Other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 standard, etc.), and so on.

A "space vehicle" (SV) as referred to herein, relates to an object that is capable of transmitting signals to receivers on the earth's surface. In one particular example, such a SV may comprise a geostationary satellite. Alternatively, a SV may comprise a satellite traveling in an orbit and moving relative to a stationary position on the earth. However, these are merely examples of SVs and claimed subject matter is not limited in these respects. SVs also may be referred to herein simply as "satellites."

As described herein, a GNSS receiver may comprise and/or be incorporated into an electronic device. This may include a single entity or may include multiple entities such as in a personal area network where a user may employ audio, video and/or data I/O devices and/or body sensors and a separate wireline or wireless modem. As described herein, an estimate of a location of the Global Positioning System (GPS) receiver may be referred to as a location, location estimate, location fix, fix, position, position estimate or position fix, and may be geodetic, thus providing location coordinates for the GPS receiver (e.g., latitude and longitude) which may or may not include an altitude component (e.g., height above sea level, height above or depth below ground level, floor level or basement level). In some embodiments, a location of the GPS receiver and/or an electronic device comprising the GPS receiver may also be expressed as an area or volume (defined either geodetically or in civic form) within which the GPS receiver is expected to be located with some probability or confidence level (e.g., 67%, 95%, etc.). In the description contained herein, the use of the term location may comprise any of these variants unless indicated otherwise. When computing the location of a GPS receiver, such computations may solve for local X, Y, and possibly Z coordinates and then, if needed, convert the coordinates from one coordinate frame to another.

As noted, GNSS positioning can often consume relatively large amount of power. This can be particularly burdensome to devices having tight power budgets, such as mobile devices powered by batteries. To address these and other issues, embodiments herein provide for accuracy-specific positioning, whereby a GNSS receiver can use accuracy requirements (e.g., as provided in a request from an application processor) to determine which GNSS band(s) to use when determining GNSS positioning fix information. As such, a embodiments enable a GNSS receiver to use a single GNSS band when an accuracy requirement allows, providing power savings that otherwise would not be achieved. Additional details will follow after an initial description of relevant systems and technologies.

FIG. 1 is a simplified illustration of a positioning system 100 in which a mobile device 105, location server 160, and/or other components of the positioning system 100 can use the techniques provided herein for accuracy-based GNSS band selection for positioning of the mobile device 105, according to an embodiment. The techniques described herein may be implemented by one or more components of the positioning system 100. The positioning system 100 can include: a mobile device 105; one or more satellites 110 (also referred to as space vehicles (SVs)) for a GNSS such as the GPS, GLONASS (GLO), Galileo (GAL), or BeiDou Navigation Satellite System (BDS) over China; base stations 120; access points (APs) 130; location server 160; network 170; and external client 180. Generally put, the positioning system 100 can estimate a location of the mobile device 105 based on radio frequency (RF) signals received by and/or sent from the mobile device 105 and known locations of other components (e.g., GNSS satellites 110, base stations 120, APs 130) transmitting and/or receiving the RF signals. Additional details regarding particular location estimation techniques are discussed in more detail with regard to FIG. 2.

In this example, FIG. 1 illustrates the mobile device 105 as a smartphone device, however, mobile devices may be any suitable device that includes GNSS capabilities or may be a device or machine into which such GNSS capabilities are integrated. Thus, a mobile device 105 may include personal devices such as a smartphone, smartwatch, tablet, laptop, etc. However, mobile devices may include a larger class of device as well and may include vehicles with integrated GNSS receivers and positioning systems, such as boats or ships, cars, trucks, aircraft, shipping containers, etc. As noted, in certain contexts, such as in reference to a cellular network, the mobile device 105 may be referred to as a UE.

It should be noted that FIG. 1 provides only a generalized illustration of various components, any or all of which may be utilized as appropriate, and each of which may be duplicated as necessary. Specifically, although only one mobile device 105 is illustrated, it will be understood that many mobile devices (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network.

The base stations 120 and access points (APs) 130 may be communicatively coupled to the network 170. In some embodiments, the base station 120s may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. The functionality performed by a base station 120 in earlier-generation networks (e.g., 3G and 4G) may be separated into different functional components (e.g., radio units (RUs), distributed units (DUs), and central units (CUs)) and layers (e.g., L1/L2/L3) in view Open Radio Access Networks (O-RAN) and/or Virtualized Radio Access Network (V-RAN or vRAN) in 5G or later networks, which may be executed on different devices at different locations connected, for example, via fronthaul, midhaul, and backhaul connections. As referred to herein, a "base station" (or ng-eNB, gNB, etc.) may include any or all of these functional components. An AP 130 may comprise a Wi-Fi AP or a Bluetooth® AP or an AP having cellular capabilities (e.g., 4G LTE and/or 5G NR), for example. Thus, mobile device 105 can send and receive information with network-connected devices, such as location server 160, by accessing the network 170 via a base station 120 using a first communication link 133. Additionally or alternatively, because APs 130 also may be communicatively coupled with the network 170, mobile device 105 may communicate with network-connected and Internet-connected devices, including location server 160, using a second communication link 135, or via one or more other mobile devices 145.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. Physical transmission points may comprise an array of antennas of a base station 120 (e.g., as in a Multiple Input-Multiple Output (MIMO) system and/or where the base station employs beamforming). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

As used herein, the term "cell" may generically refer to a logical communication entity used for communication with a base station 120, and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

The location server 160 may comprise a server and/or other computing device configured to determine an estimated location of mobile device 105 and/or provide data (e.g., "assistance data") to mobile device 105 to facilitate location measurement and/or location determination by mobile device 105. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for mobile device 105 based on subscription information for mobile device 105 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of mobile device 105 using a control plane (CP) location solution for LTE radio access by mobile device 105. The location server 160 may further comprise a Location Management Function (LMF) that supports location of mobile device 105 using a control plane (CP) location solution for NR or LTE radio access by mobile device 105.

In a CP location solution, signaling to control and manage the location of mobile device 105 may be exchanged between elements of network 170 and with mobile device 105 using existing network interfaces and protocols and as signaling from the perspective of network 170. In a UP location solution, signaling to control and manage the location of mobile device 105 may be exchanged between location server 160 and mobile device 105 as data (e.g. data transported using the Internet Protocol (IP) and/or Transmission Control Protocol (TCP)) from the perspective of network 170.

As previously noted (and discussed in more detail below), the estimated location of mobile device 105 may be based on measurements of RF signals sent from and/or received by the mobile device 105. In particular, these measurements can provide information regarding the relative distance and/or angle of the mobile device 105 from one or more components in the positioning system 100 (e.g., GNSS satellites 110, APs 130, base stations 120). The estimated location of the mobile device 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. For example, in some embodiments, a location of the mobile device 105 may be estimated at least in part based on measurements of RF signals 140 communicated between the mobile device 105 and one or more other mobile devices 145, which may be mobile or fixed. As illustrated, other mobile devices may include, for example, a mobile phone 145-1, vehicle 145-2, and/or static communication/positioning device 145-3. When or more other mobile devices 145 are used in the position determination of a particular mobile device 105, the mobile device 105 for which the position is to be determined may be referred to as the "target mobile device," and each of the one or more other mobile devices 145 used may be referred to as an "anchor mobile device." For position determination of a target mobile device, the respective positions of the one or more anchor mobile devices may be known and/or jointly determined with the target mobile device. Direct communication between the one or more other mobile devices 145 and mobile device 105 may comprise sidelink and/or similar Device-to-Device (D2D) communication technologies. Sidelink, which is defined by 3GPP, is a form of D2D communication under the cellular-based LTE and NR standards.

According to some embodiments, such as when the mobile device 105 comprises and/or is incorporated into a vehicle, a form of D2D communication used by the mobile device 105 may comprise vehicle-to-everything (V2X) communication. V2X is a communication standard for vehicles and related entities to exchange information regarding a traffic environment. V2X can include vehicle-to-vehicle (V2V) communication between V2X-capable vehicles, vehicle-to-infrastructure (V2I) communication between the vehicle and infrastructure-based devices (commonly termed roadside units (RSUs)), vehicle-to-person (V2P) communication between vehicles and nearby people (pedestrians, cyclists, and other road users), and the like. Further, V2X can use any of a variety of wireless RF communication technologies. Cellular V2X (CV2X), for example, is a form of V2X that uses cellular-based communication such as LTE (4G), NR (5G) and/or other cellular technologies in a direct-communication mode as defined by 3GPP. The mobile device 105 illustrated in FIG. 1 may correspond with a component or device on a vehicle, RSU, or other V2X entity that is used to communicate V2X messages. The static communication/positioning device 145-3 (which may correspond with an RSU) and/or the vehicle 145-2, therefore, may communicate with the mobile device 105 and may be used to determine the position of the mobile device 105 using techniques similar to those used by base stations 120 and/or APs 130 (e.g., using multiangulation and/or multilateration). It can be further noted that mobile devices 145 (which may include V2X devices), base stations 120, and/or APs 130 may be used together (e.g., in a WWAN positioning solution) to determine the position of the mobile device 105, according to some embodiments.

An estimated location of mobile device 105 can be used in a variety of applications—e.g. to assist direction finding or navigation for a user of mobile device 105 or to assist another user (e.g. associated with external client 180) to locate mobile device 105. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of mobile device 105 may comprise an absolute location of mobile device 105 (e.g. a latitude and longitude and possibly altitude) or a relative location of mobile device 105 (e.g. a location expressed as distances north or south, east or west and possibly above or below some other known fixed location (including, e.g., the location of a base station 120 or AP 130) or some other location such as a location for mobile device 105 at some known previous time, or a location of another mobile device 145 at some known previous time). As noted elsewhere herein, a location may be specified as a geodetic location comprising coordinates which may be absolute (e.g. latitude, longitude and optionally altitude), relative (e.g. relative to some known absolute location) or local (e.g. X, Y and optionally Z coordinates according to a coordinate system defined relative to a local area such a factory, warehouse, college campus, shopping mall, sports stadium or convention center). A location may instead be a civic location and may then comprise one or more of a street address (e.g. including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g. a circle or ellipse) within which mobile device 105 is expected to be located with some level of confidence (e.g. 95% confidence).

The external client 180 may be a web server or remote application that may have some association with mobile device 105 (e.g. may be accessed by a user of mobile device 105) or may be a server, application, or computer system providing a location service to some other user or users which may include obtaining and providing the location of mobile device 105 (e.g. to enable a service such as friend or relative finder, or child or pet location). Additionally or alternatively, the external client 180 may obtain and provide the location of mobile device 105 to an emergency services provider, government agency, etc.

As noted, the mobile device 105 of FIG. 1 may be capable of GNSS positioning. Details regarding GNSS positioning of a mobile device 105, or any device comprising a GNSS receiver, are provided hereafter with regard to FIG. 2.

Figure 2:
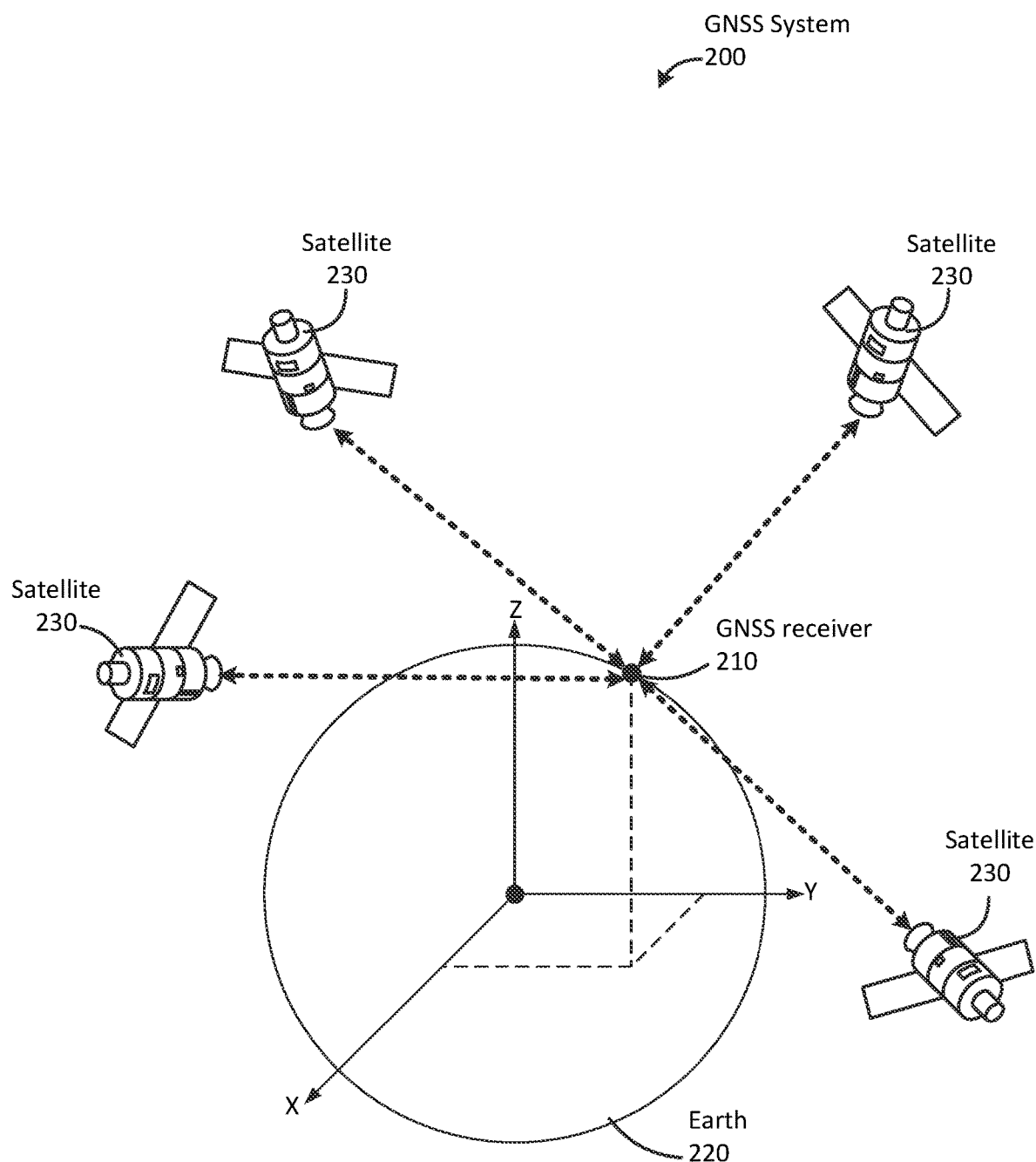
FIG. 2 is a simplified diagram of a GNSS system, according to an embodiment.

FIG. 2 is a simplified diagram of a GNSS system 200, provided to illustrate how GNSS is generally used to determine an accurate location of a GNSS receiver 210 on earth 220. Put generally, the GNSS system 200 enables an accurate GNSS position fix of the GNSS receiver 210, which receives RF signals from GNSS satellites 230 from one or more GNSS constellations. The types of GNSS receiver 210 used may vary, depending on application. In some embodiments, for instance, the GNSS receiver 210 may comprise a standalone device or component incorporated into another device (e.g., mobile device 105 of FIG. 1). In some embodiments, the GNSS receiver 210 may be integrated into industrial or commercial equipment, such as survey equipment, Internet of Things (IoT) devices, etc.

It will be understood that the diagram provided in FIG. 2 is greatly simplified. In practice, there may be dozens of satellites 230 and a given GNSS constellation, and there are many different types of GNSS systems. As noted, GNSS systems include GPS, Galileo, GLONASS, or BDS. Additional GNSS systems include, for example, Quasi-Zenith Satellite System (QZSS) over Japan, Indian Regional Navigational Satellite System (IRNSS) over India, etc. In addition to the basic positioning functionality later described, GNSS augmentation (e.g., a Satellite Based Augmentation System (SBAS)) may be used to provide higher accuracy. Such augmentation may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

GNSS positioning is based on trilateration/multilateration, which is a method of determining position by measuring distances to points at known coordinates. In general, the determination of the position of a GNSS receiver 210 in three dimensions may rely on a determination of the distance between the GNSS receiver 210 and four or more satellites 230. As illustrated, 3D coordinates may be based on a coordinate system (e.g., XYZ coordinates; latitude, longitude, and altitude; etc.) centered at the earth's center of mass. A distance between each satellite 230 and the GNSS receiver 210 may be determined using precise measurements made by the GNSS receiver 210 of a difference in time from when a RF signal is transmitted from the respective satellite 230 to when it is received at the GNSS receiver 210. To help ensure accuracy, not only does the GNSS receiver 210 need to make an accurate determination of when the respective signal from each satellite 230 is received, but many additional factors need to be considered and accounted for. These factors include, for example, clock differences at the GNSS receiver 210 and satellite 230 (e.g., clock bias), a precise location of each satellite 230 at the time of transmission (e.g., as determined by the broadcast ephemeris), the impact of atmospheric distortion (e.g., ionospheric and tropospheric delays), and the like.

To perform a traditional GNSS position fix, the GNSS receiver 210 can use code-based positioning to determine its distance to each satellite 230 based on a determined delay in a generated pseudorandom binary sequence received in the RF signals received from each satellite, in consideration of the additional factors and error sources previously noted. With the distance and location information of the satellites 230, the GNSS receiver 210 can then determine a position fix for its location. This position fix may be determined, for example, by a Standalone Positioning Engine (SPE) executed by one or more processors of the GNSS receiver 210. However, code-based positioning is relatively inaccurate and, without error correction, and is subject to many of the previously described errors. Even so, code-based GNSS positioning can provide an positioning accuracy for the GNSS receiver 210 on the order of meters.

More accurate carrier-based ranging is based on a carrier wave of the RF signals received from each satellite, and may use measurements at a base or reference station (not shown) to perform error correction to help reduce errors from the previously noted error sources. More specifically, errors (e.g., atmospheric errors sources) in the carrier-based ranging of satellites 230 observed by the GNSS receiver 210 can be mitigated or canceled based on similar carrier-based ranging of the satellites 230 using a highly accurate GNSS receiver at the base station at a known location. These measurements and the base station's location can be provided to the GNSS receiver 210 for error correction. This position fix may be determined, for example, by a Precise Positioning Engine (PPE) executed by one or more processors of the GNSS receiver 210. More specifically, in addition to the information provided to an SPE, the PPE may use base station GNSS measurement information, and additional correction information, such as troposphere and ionosphere, to provide a high accuracy, carrier-based position fix. Several GNSS techniques can be adopted in PPE, such as Differential GNSS (DGNSS), Real Time Kinematic (RTK), and Precise Point Positioning (PPP), and may provide a sub-meter accuracy (e.g., on the order of centimeters). (An SPE and/or PPE may be referred to herein as a GNSS positioning engine, and may be incorporated into a broader positioning engine that uses other (non-GNSS) positioning sources.)

Multi-frequency GNSS receiver is use satellite signals from different GNSS frequency bands (also referred to herein simply as "GNSS bands") to determine desired information such as pseudoranges, position estimates, and/ or time. Using multi-frequency GNSS may provide better performance (e.g., position estimate speed and/or accuracy) than single-frequency GNSS in many conditions. However, as discussed in more detail hereafter, using multi-frequency GNSS typically uses more power than single-frequency GNSS, e.g., processing power and battery power (e.g., to power a processor (e.g., for determining measurements), baseband processing, and/or RF processing).

Referring again to FIG. 2, the satellites 230 may be members of a single satellite constellation, i.e., a group of satellites that are part of a GNSS system, e.g., controlled by a common entity such as a government, and orbiting in complementary orbits to facilitate determining positions of entities around the world. One or more of the satellites 230 may transmit multiple satellite signals in different GNSS frequency bands, such as L1, L2, and/or L5 frequency bands. The terms L1 band, L2 band, and L5 band are used herein because these terms are used for GPS to refer to respective ranges of frequencies. Various receiver configurations may be used to receive satellite signals. For example, a receiver may use separate receive chains for different frequency bands. As another example, a receiver may use a common receive chain for multiple frequency bands that are close in frequency, for example L2 and L5 bands. As another example, a receiver may use separate receive chains for different signals in the same band, for example GPS L1 and GLONASS L1 sub-bands. A single receiver may use a combination of two or more of these examples. These configurations are examples, and other configurations are possible.

Multiple satellite bands are allocated to satellite usage. These bands include the L-band, used for GNSS satellite communications, the C-band, used for communications satellites such as television broadcast satellites, the X-band, used by the military and for RADAR applications, and the Ku-band (primarily downlink communication and the Ka-band (primarily uplink communications), the Ku and Ka bands used for communications satellites. The L-band is defined by IEEE as the frequency range from 1 to 2 GHz. The L-Band is utilized by the GNSS satellite constellations such as GPS, Galileo, GLONASS, and BDS, and is broken into various bands, including L1, L2, and L5. For location purposes, the L1 band has historically been used by commercial GNSS receivers. However, measuring GNSS signals across more than one band may provide for improved accuracy and availability.

Figure 3:
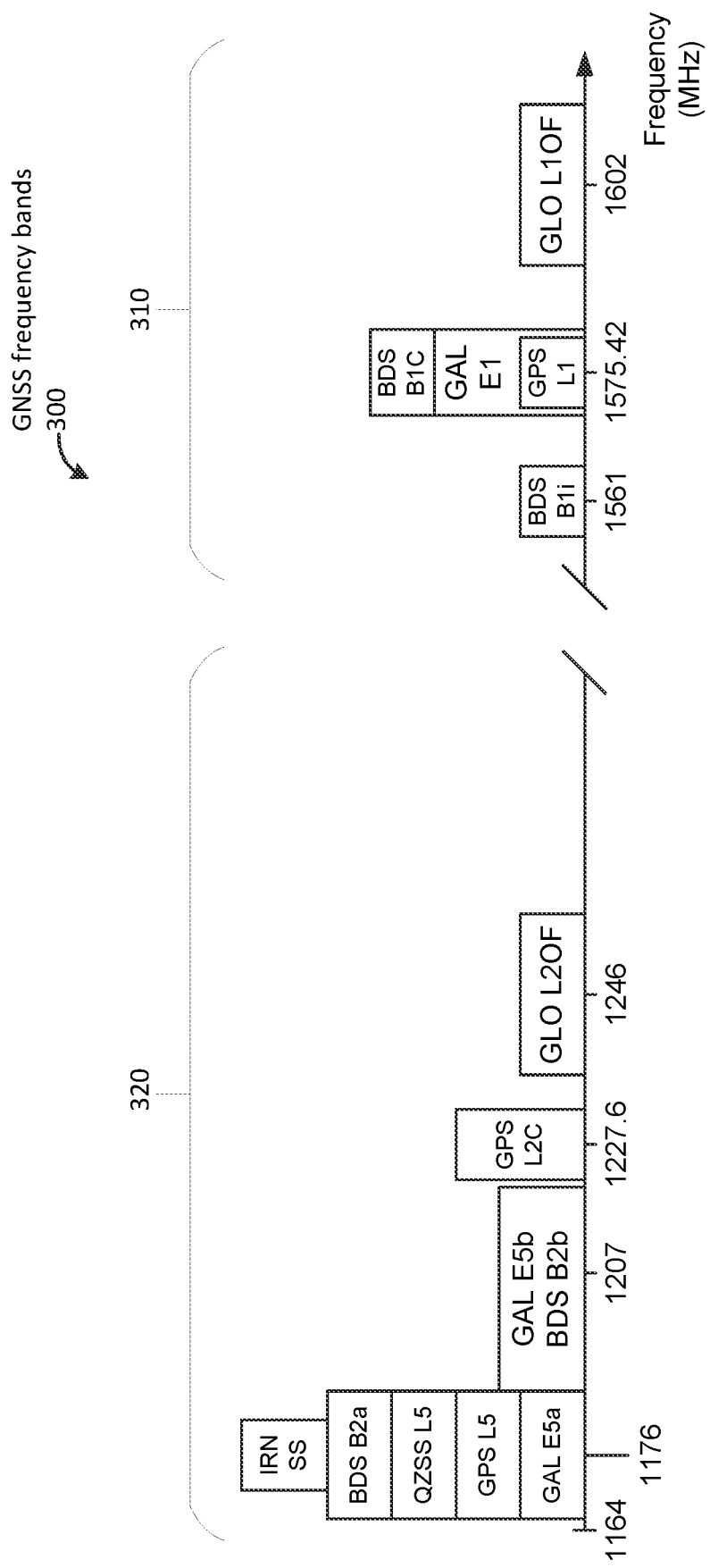
FIG. 3 is a frequency band plot of satellite signals and frequencies of the satellite signals.

FIG. 3 is a diagram of GNSS frequency bands 300, which may be used in GNSS receivers, according to embodiments herein. (Like other figures, FIG. 3 not shown to scale). The GNSS frequency bands 300 show that GNSS constellations operate on several frequencies in the L-Band. The L1 frequency band typically covers frequencies from 1559 MHz to 1606 MHz and includes L1 signals from GPS, Galileo, BDS, GLONASS, and QZSS GNSS constellations. Bands within this spectrum may be referred to herein as the "upper bands" 310. The same constellations that use these upper bands 310 may also transmit concurrently using one or more other bands in the frequency spectrum generally from 1164 MHz to 1246 MHz, which may be referred to herein as the "lower bands" 320. Example bands within the lower bands 320 include the L2 frequency band and the L5 frequency band. Satellites may transmit, for example L2 and/or L5 signals along with L1 signals. L2 and L5 signals may complement the L1 signals, which have been used for many years. For example, the L5 signals have wider signal bandwidth than the L1 signals, which helps improve positioning performance in multi-path environments. Also, using the L5 signals in addition to the L1 signals can allow for frequency diversity. The L2 and L5 signals are far enough away in frequency from the L1 signals, for example, that different processing paths are typically used to measure the L2 and L5 signals versus the L1 signals. While the discussion herein focuses on the L1 and L5 bands, the discussion (including the claims) is not limited to these bands, nor is the discussion limited to the use of satellite signals in two or three bands.

Figure 4:
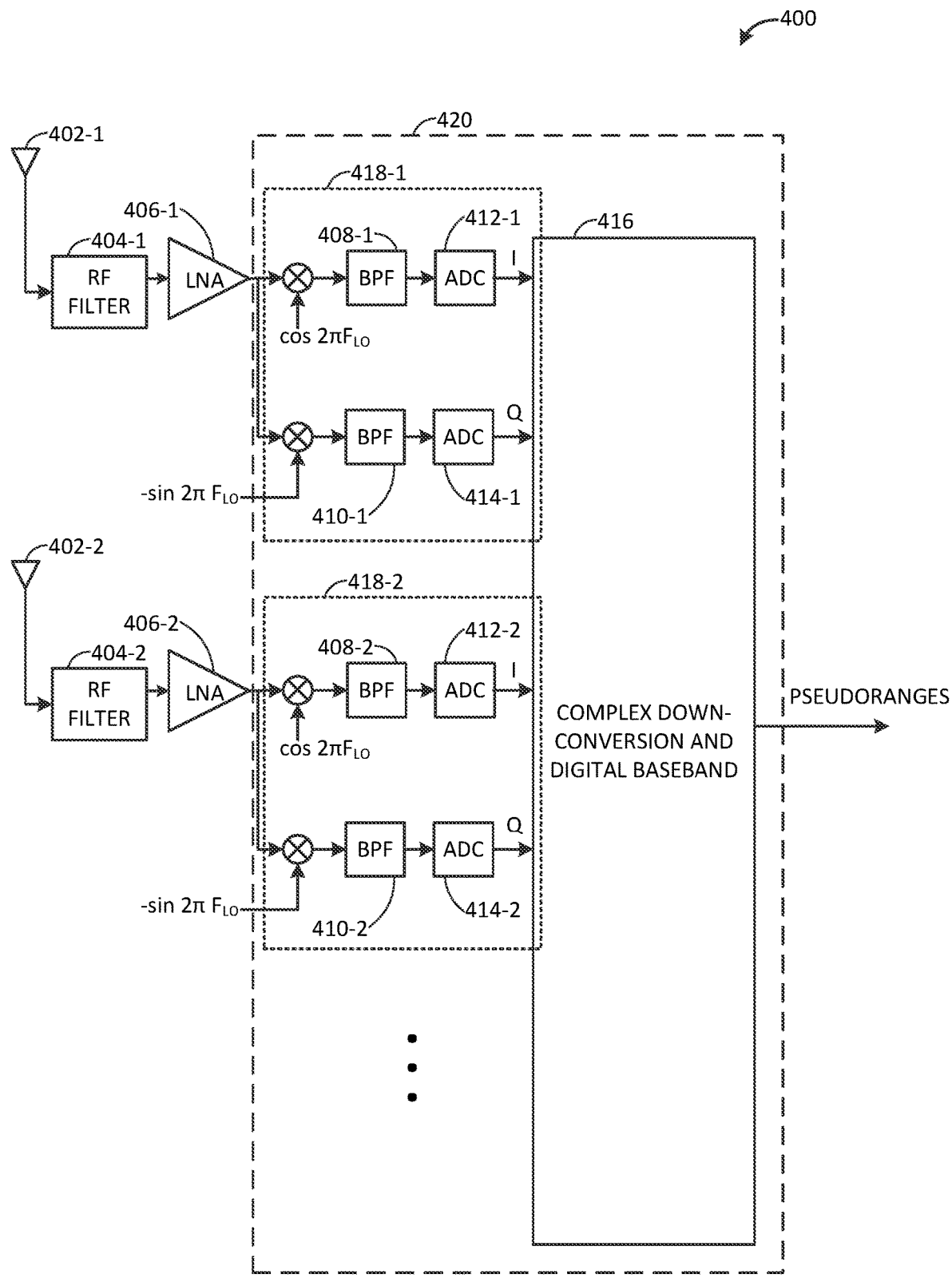
FIG. 4 illustrates a simplified block diagram of an example GNSS receiver, according to an embodiment.

FIG. 4 illustrates a simplified block diagram of an example signal processing architecture 400 that may be used in a GNSS receiver to implement GNSS signal acquisition and tracking using multiple GNSS frequency bands. This signal processing architecture 400 may be implemented in hardware and/or software components of a GNSS receiver, such as the GNSS receives discussed elsewhere herein (e.g., with respect to FIGS. 1-10), including GNSS receiver 1080 of FIG. 12, which is described in more detail hereafter.

It can be noted that alternative embodiments may implement variations to the signal processing architecture 400 illustrated in FIG. 4. For example, the signal processing architecture 400 illustrates two RF chains (a first RF chain represented by components 402-1 to 414-1, and a second RF chain represented by components 402-2 to 414-2), however embodiments are not so limited. Alternative embodiments may have any number of RF chains, including only one. As noted hereafter, different RF chains may be used to receive and process different bands or groups of bands. In some embodiments, for example, the first RF chain represented by components 402-1 to 414-1 may receive and process one or more upper bands 310 (of FIG. 3), and the second RF chain represented by components 402-2 to 414-2 receive and process one or more lower bands 320. Moreover, components such as antennas, filters, amplifiers, or any combination thereof may be shared by different RF chains. Different RF chains may employ different architectures. That said, some RF chains may employ the same architecture. As illustrated in FIG. 4, the architecture of the second RF chain mirrors that of the first. As such, the following description of the components 402-1 to 414-1 may be applied to components 402-2 to 414-2 (e.g., for a different pair of GNSS signals).

A single RF chain may be capable of receiving and processing multiple GNSS signals. For example, the first RF chain represented by components 402-1 to 414-1 may be used to process two GNSS signals, $GNSS_1$ and $GNSS_2$, by mixing the received signals with a local oscillator (LO) signal having a frequency $F_{LO}$ that is determined based, at least in part, on first and second carrier frequencies $f_1$ and $f_2$. As shown in FIG. 4 according to a particular implementation, signal processing architecture 400 may receive signals $GNSS_1$ and $GNSS_2$ at a single antenna 402-1, a bandpass RF filter 404-1 such as surface acoustic wave (SAW) filter, and low-noise amplifier (LNA) 406-1. The received GNSS signals may then be complexly downconverted to intermediate frequencies by mixing the received signals with the LO signal as shown.

In this context, a "downconversion" may relate to transforming an input signal having a first frequency characteristic to an output signal having second frequency characteristic. In one particular implementation, although claimed subject matter is not limited in this respect, such a downconversion may comprise transformation of a first signal to a second signal, where the second signal has a frequency characteristic of a lower frequency than that of the first signal. Here, in particular examples, such a downconversion may comprise transformation of a radio frequency (RF) signal to an intermediate frequency (IF) signal, or transformation of an IF signal to a baseband signal and/or baseband information. However, these are merely examples of a downconversion and claimed subject matter is not limited in this respect.

Returning to the example in which the first RF chain represented by components 402-1 to 414-1 is used to process two GNSS signals, by selecting $F_{LO}$ at about a midpoint between $f_1$ and $f_2$, portions of downconverted signals may substantially covered by bandpass filters (BPFs) 408-1 and 410-1. Here, for example, a selection of a particular frequency for $F_{LO}$ may result in an image frequency component of one downconverted GNSS signal that may substantially overlapping a desired signal component of another downconverted GNSS signal. In particular embodiments, impacts of such overlapping can be avoided without attenuating image frequency components before mixing with LO. It should be understood, however, that in other implementations $F_{LO}$ may be selected to be somewhere other than about a midpoint between $f_1$ and $f_2$.

In-phase (I) and quadrature (Q) components filtered by associated BPFs 408-1 and 410-1 may then be digitally sampled at analog to digital conversion circuits (ADCs) 412 and 414 to provide digitally sampled in-phase and quadrature components for further processing, including complex downconversion (e.g., to baseband) and digital baseband processing 416. Here, ADCs 412-1 and 414-1 may be adapted to sample output signals of BPFs 408-1 and 410-1 at or above the Nyquist rate of the combined signal.

Also, the presently illustrated implementation includes ADCs 412-1 and 414-1 between first and second downconversion stages (e.g., within IF downconversion and processing block 418-1). It should be understood, however, that other architectures may be implemented without deviating from claimed subject matter. In other implementations, for example, analog to digital conversion may occur following a second downconversion. Again, these are merely example implementations and claimed subject matter is not limited in these respects.

Also, in alternative implementations, ADCs 412-1 and 414-1 may be replaced with a single complex ADC or with a single time shared and/or multiplexed ADC with appropriate delays to be shared between in-phase and quadrature signal paths.

In particular implementations, $GNSS_1$ and/or $GNSS_2$ may comprise any one of several pairs of different GNSS signals. In one particular embodiment, although claimed subject matter is not limited in this respect, $GNSS_1$ and $GNSS_2$ may be selected such that $f_1$ and $f_2$ are near in frequency to enable low cost manufacture of SAW 404-1 and/or LNA 406-1 by limiting an operating band. Here, for example, $GNSS_1$ and $GNSS_2$ may comprise any one of several pairs such as GPS L1 and GLONASS L1 (where $f_1$=1575 MHz and $f_2$=1602 MHz), GPS L1 and Compass L1 (where $f_1$=1575 MHz and $f_2$=1590 or 1561 MHz), Galileo L1 and GLONASS L1 (where $f_1$=1575 MHz and $f_2$=1602 MHz), GPS L2 and GLONASS L2 (where $f_1$=1228 MHz and $f_2$=1246 MHz) and GPS L2 and Compass L2 (where $f_1$=1228 MHz and $f_2$=1269 or 1207 MHz). It should be understood, however, that these are merely particular examples of GNSS pairs that may be selected in particular implementations, and claimed subject matter is not limited to any particular GNSS pair.

In particular embodiments, the bandwidth of BPFs 408-1 and 410-1 may be centered at about a common intermediate frequency $IF_o$ to process portions of GNSS signals received from both $GNSS_1$ and $GNSS_2$. In addition, the bandwidth of BPFs 408 and 410 may be implemented to be wide enough to capture enough information GNSS signals received from both $GNSS_1$ and $GNSS_2$ without introducing significant noise outside the bands of components 402 and 404. Additionally, BPFs 408-1 and 410-1 may be chosen to be narrow enough to enable sampling by ADCs 412-1 and 414-1 at a given sample rate (e.g., at about the Nyquist rate) without significant distortion.

According to particular implementations, sampled in-phase and quadrature components provided by ADCs 412-1 and 414-1 may be further processed according to a complex downconversion and digital baseband 416, which can be used to generate in-phase and quadrature components, and output pseudoranges derived from the GNSS signals. According to some embodiments, the output of the complex downconversion and digital baseband 416 may more broadly be referred to as a measurement, where the measurement may comprise a pseudorange, or a pseudorange and carrier phase.

As noted, the signal processing architecture 400 may have many RF chains to be able to receive and process many GNSS signals. Each RF chain may receive and process one or more GNSS signals (e.g., in pairs), as previously described. In some embodiments, an RF chain may receive and process a single GNSS signal, in which case an similar to the first RF chain represented by components 402-1 to 414-1 may be used, but modified (e.g., components may be tuned for the frequency of the single GNSS signal).

In the example provided in FIG. 4, components of the signal processing architecture 400 included in block 418 may be integrated into a single IC, while other components, such as antennas 402, RF filters 404, and LNAs 406, may be included in separate circuitry. Even so, on-chip components of RF chains such as IF downconversion and processing blocks 418 may be powered down if RF chains are not in use, resulting in overall power savings. Thus, according to some embodiments, a GNSS receiver may be capable of powering down at least portions of and RF chain when not in use, including corresponding on-chip components within block 420 and/or components outside of block 420. For example, if a GNSS receiver is using one or more GNSS signals received and processed by the first RF chain represented by components 402-1 to 414-1 but not using any GNSS signals received and processed by the second RF chain represented by components 402-2 to 414-2, the GNSS receiver may keep components 402-1 to 414-1 powered on (e.g., operating the first RF chain to receive and process the one or more GNSS signals used by the GNSS receiver) and power down or power off one or more of components 402-2 to 414-2.

Generally put, the more GNSS signals, or bands, used by a GNSS receiver to determine location/pseudo-ranges, the more accurate the ultimate location determination will be. As previously noted, however, this additional accuracy comes at the cost of additional power usage. With this in mind, embodiments provided herein leverage the capability of a GNSS receiver to power down separate RF chains to enable GNSS band selection based on application requirements specific to a position determination.

As a specific example, GPS L1 and L5 bands relatively far apart in frequency, as illustrated in FIG. 3, relative to other GNSS bands. Thus, in implementation, a GNSS receiver typically utilizes different RF chains and circuitry to separately receive and process GNSS signals on these bands, which can be later combined at the digital level. This results in a lot more power usage if both bands are being used. That said, the use of L5 can increase the accuracy of the pseudoranges output by the GNSS receiver which, in turn, increases the accuracy of the position determination. This is due, in part, to the fact that using two bands, L1 and L5, can enable a GNSS receiver to determine and reduce/eliminate ionosphere error. Further, a GNSS receiver may use a single RF chain to receive and process signals from both L2 and L5 GPS bands, as previously noted. Thus, using both L2 and L5 bands (in addition to L1) may take a relatively small amount of additional power than using L5 alone. A GNSS receiver may therefore use both L2 and L5 bands for increased accuracy if use of L1 band alone is insufficient, according to some embodiments. Even so, such accuracy may not be needed in all circumstances. According to some embodiments, an accuracy indication may be provided to the GNSS receiver to enable the GNSS receiver to determine whether to use one or more additional bands. An application processor may provide this indication. An example exchanged between an application processor and GNSS receiver is provided with reference to FIG. 5.

Figure 5:
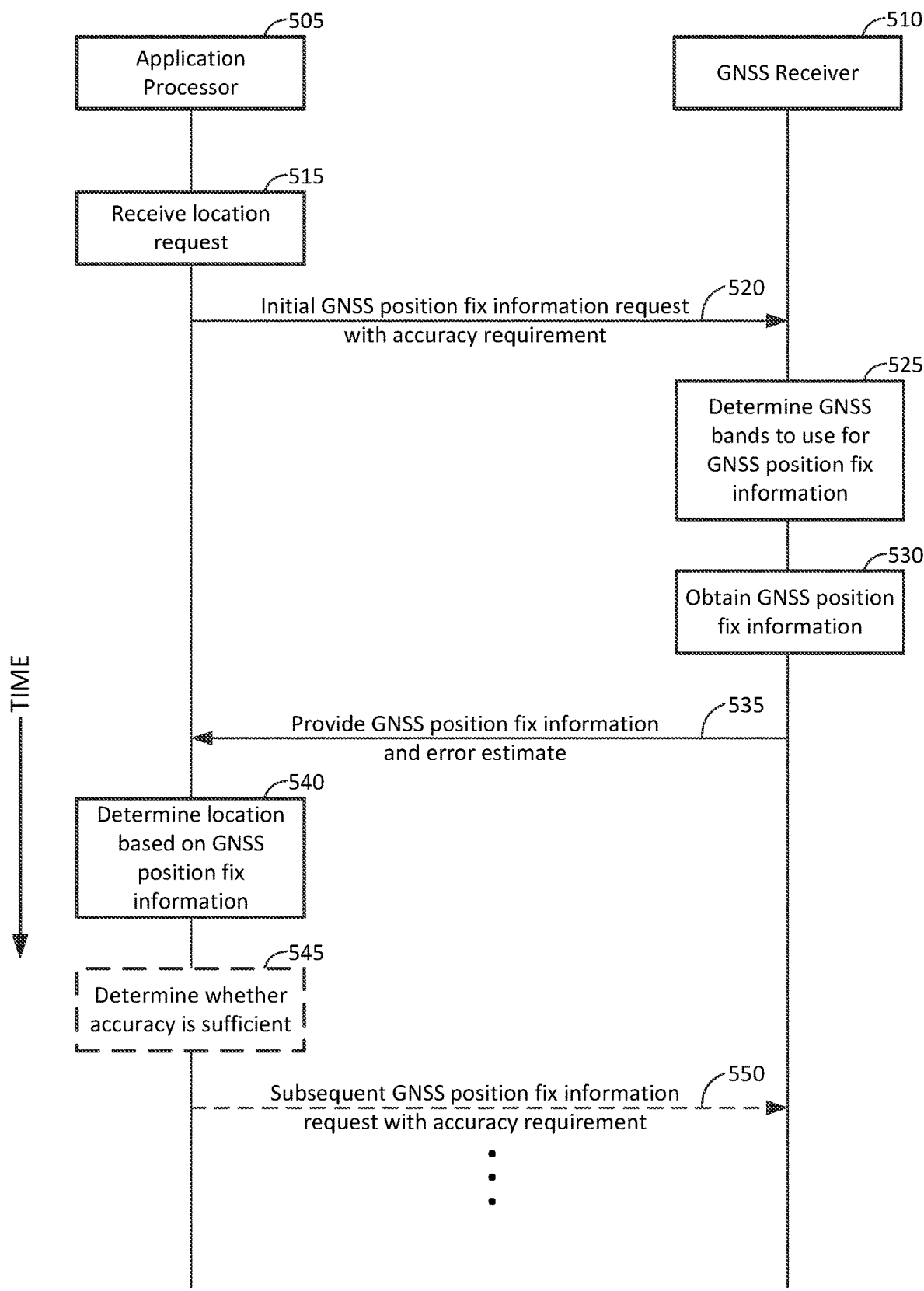
FIG. 5 is a call flow diagram illustrating an example exchange between an application processor and GNSS receiver, according to an embodiment.

FIG. 5 is a call-flow diagram of an example exchanged between an application processor 505 and a GNSS receiver 510 in which the GNSS receiver performs accuracy-based band selection, according to an embodiment. As noted elsewhere herein, the GNSS receiver may comprises circuitry (e.g., integrated circuits (ICs)) and/or software modules capable of receiving GNSS signals and determining pseudoranges and/or GNSS position fixes. Accordingly, the GNSS receiver may comprise a processor (e.g., an application processor of an integrated modem or GNSS module, or a dedicated processor (e.g., and ARM 7) in a discrete GNSS chipset). According to some embodiments, both the processor 505 and the GNSS receiver 510 may be integrated into a single mobile device. Communication between the processor 505 and the GNSS receiver 510 may be made, for example, via an application programming interface (API) of the GNSS receiver 510. An example of such a mobile device is provided in FIG. 10, which is described hereafter.

The process may begin with the functionality illustrated at block 515, in which the application processor receives a location request. The location request may be received from an application executed by the application processor 505, another device (e.g., another mobile device or a server via a wireless message), and/or by input from another component (e.g., of the mobile device), such as firmware, user input at a user interface (UI), or the like.

Further, the application processor may be capable of determining a level of accuracy needed for the location determination. This level of accuracy may be application-specific. For example, for a mobile device comprising a smart phone executing an Internet browser, a website for a retail chain of stores may request, via the Internet browser, a rough approximation of where the mobile device is located (e.g., on the order of tens of meters) to provide an indication of which stores are nearby. The Internet browser may pass this request to the application processor 505, which it may then use to determine the level of accuracy needed is relatively low. On the other hand, for a mobile device comprising a vehicle executing navigation or self-driving functionality requiring a relatively high level of accuracy (e.g., on the order of five meters or less), the navigation or self-driving function may indicate this to the application processor 505, which it may then use to determine the level of accuracy needed is relatively high.

According to some embodiments, the application processor 505 may execute a positioning engine capable of determining the position of the mobile device based, at least in part, on pseudoranges output by the GNSS receiver 510. Optionally, the positioning engine may determine the position of the mobile device based on one or more additional positioning sources, such as terrestrial RF positioning systems (e.g., cellular-based positioning, WiFi-based positioning, UWB-based positioning, etc.), movement sensors (e.g., accelerometers, gyroscopes, magnetometers, etc.), device-specific systems (e.g., for vehicles, this may include a speedometer, odometer, radar, lidar, etc.), As well as historical movement/positioning information of the mobile device. The application processor 505 may take into consideration the positioning accuracy of these additional positioning sources when determining a needed accuracy from the GNSS receiver 510. For example, if the application processor 505 is capable of determining a relatively accurate position of the mobile device using the positioning engine and additional positioning sources, then accurate GNSS position fix information, may not be needed from the GNSS receiver 510. On the other hand, if an accurate position is needed and the positioning engine cannot provide an accurate position of the mobile device from the additional positioning sources, accurate GNSS position fix information may be needed from the GNSS receiver 510.

The application processor 505 may then send an initial GNSS position fix information request to the GNSS receiver 510, as indicated at arrow 520, in which the determined level of accuracy is provided as an accuracy requirement. Here, "GNSS position fix information" comprises a request for a GNSS position fix of the GNSS receiver (and/or device into which the GNSS receiver may be integrated) and/or pseudorange information from which a GNSS position fix may be made. The type of GNSS position fix information requested may vary based on the capabilities of the application processor for utilizing a GNSS position fix and/or the pseudorange information (e.g., when fusing the information with other positioning information).

According to some embodiments, the accuracy requirement may be provided in the form of an error estimate. For example, if a position fix and/or pseudoranges having an accuracy of 5 m or less is desired from the GNSS receiver 510, the application processor 505 may include, in the initial GNSS position fix information request, an indication that the initial GNSS position fix and/or pseudoranges are to have an error estimate of no greater than 5 m. The initial GNSS position fix information request may comprise, for example, a request for aperiodic position fix information, on-demand position fix information, or a request for position fix information at some future time. (The initial GNSS position fix information may also comprise periodic position fix information. However, a process specific to periodic position fixes is provided hereafter with respect to FIG. 8.)

According to some embodiments, the accuracy requirement may be provided by the application processor 505 in one of three ways. A first type of accuracy requirement comprises a "maximum accuracy" requirement. In this case, the application processor 505 is essentially requesting that the GNSS receiver 510 provide a GNSS position fix and/or pseudoranges having the highest accuracy the GNSS receiver 510 can provide. This may be the case, for example, when positioning from other positioning sources is unreliable and/or a particular application executed by the application processor 505 needs a highly-accurate position determination. In such instances, the GNSS receiver 510 may (e.g., in addition to using multiple GNSS bands) perform additional techniques to obtain a high-precision GNSS-based position fix and/or pseudoranges, if possible. This may include, for example, using techniques such as DGNSS, RTK, PPP, etc., or a combination thereof.

A second type of accuracy requirement comprises an accuracy requirement having a no minimum accuracy. The application processor 505 may use this type of accuracy requirement if only a rough approximation of the location of the mobile device is needed. Again, this may be useful in cases where an application may only need an indication of a geographical region in which the mobile device is located to, for example, provide a user of the mobile device information relative to the geographical region. In such instances, as described in more detail hereafter, the GNSS receiver 510 may simply use a single band, or minimum number of bands, to determine a GNSS position fix/pseudoranges.

A third type of accuracy requirement may comprise a specified accuracy. As noted, this may comprise a maximum value for an error estimate of the GNSS position fix information. According to some embodiments, this specified accuracy may be adaptive, based on the accuracy needs of the application processor 505, the accuracy of a location determination provided by a positioning engine executed by the application processor 505 (e.g., which may be based on accuracy obtained from other positioning sources), the accuracy of recent GNSS positioning fixes, and/or other factors.

The GNSS receiver 510 may respond to the GNSS position fix information request by performing the functionality indicated at block 525, which comprises determining GNSS bands to use for the GNSS position fix. This determination may be based, in part, on the accuracy requirement of the GNSS position fix information request, along with other factors, such as whether a recent GNSS position fix/pseudorange determination has been made (e.g., within a threshold amount of time and/or within a threshold amount of detected movement). Further, as noted elsewhere herein, this determination may involve an iterative process to meet the accuracy requirement. Additional details regarding how a GNSS receiver 510 may determine which bands to use for the GNSS position fix/pseudorange determination are provided hereafter with regard to FIGS. 6-8.

At block 530, the GNSS receiver 510 can then obtain the GNSS position fix information and provide the GNSS position fix information and error estimate to the application processor 505, as indicated at arrow 535. As previously indicated, the GNSS position fix information may be determined by receiving and processing GNSS signals (of GNSS bands selected at block 525) in the manner previously described with respect to FIG. 4. As previously noted, the GNSS position fix information may comprise a GNSS position fix itself and/or pseudoranges of satellites from which GNSS signals were received. Optionally, the GNSS position fix information may also include carrier phase. In some embodiments, the GNSS receiver 510 may indicate to the application processor 505 (e.g., when providing the GNSS position fix information) whether the GNSS position fix information (e.g., GNSS position fix and/or pseudoranges) meets the accuracy requirement of the initial GNSS position fix information request.

As indicated at block 540, the application processor can then determine a location based, at least in part, on the GNSS position fix information. As noted, this may comprise using a positioning engine to determine the position of a mobile device. The positioning engine may, in some embodiments, use other information from additional positioning sources, in which case the positioning engine may "fuse" the data to determine an ultimate position of the mobile device.

As previously noted, the application processor 505 may perform adaptive positioning. In such instances, the application processor 505 may perform the functionality indicated at block 545 and arrow 550, in which the application processor respectively determines whether the accuracy of the determined location is sufficient and sends a subsequent GNSS position fix information request with another accuracy requirement, shown by arrow 550. If, for example, the application processor 505 determines at block 545 that the accuracy is insufficient, it may include an accuracy requirement in the subsequent GNSS position fix information (of arrow 550) that is higher than the accuracy requirement of the initial GNSS position fix information (of arrow 520), and/or an indication that the GNSS position fix information provided at arrow 535 did not meet an accuracy requirement. Alternatively, if the accuracy is insufficient (e.g., in cases where a maximum accuracy was requested and yet still insufficient to meet an accuracy requirement) the application processor may request nothing more (e.g., under the assumption that the GNSS receiver may be incapable of providing sufficiently accurate GNSS position fix information—at least currently). On the other hand, if the application processor 505 determines at block 545 that the accuracy is higher than needed (e.g., beyond a threshold value of a needed accuracy requirement), it may include an accuracy requirement in the subsequent GNSS position fix information (of arrow 550) that is lower than the accuracy requirement of the initial GNSS position fix information (of arrow 520). The GNSS receiver 510 can respond to the subsequent GNSS position fix information in a manner similar to the initial GNSS position fix information, and the process shown in FIG. 5 may be repeated. Additional GNSS position requests may be made, for example, until the application processor 505 no longer needs a location determination for the mobile device.

Figure 6:
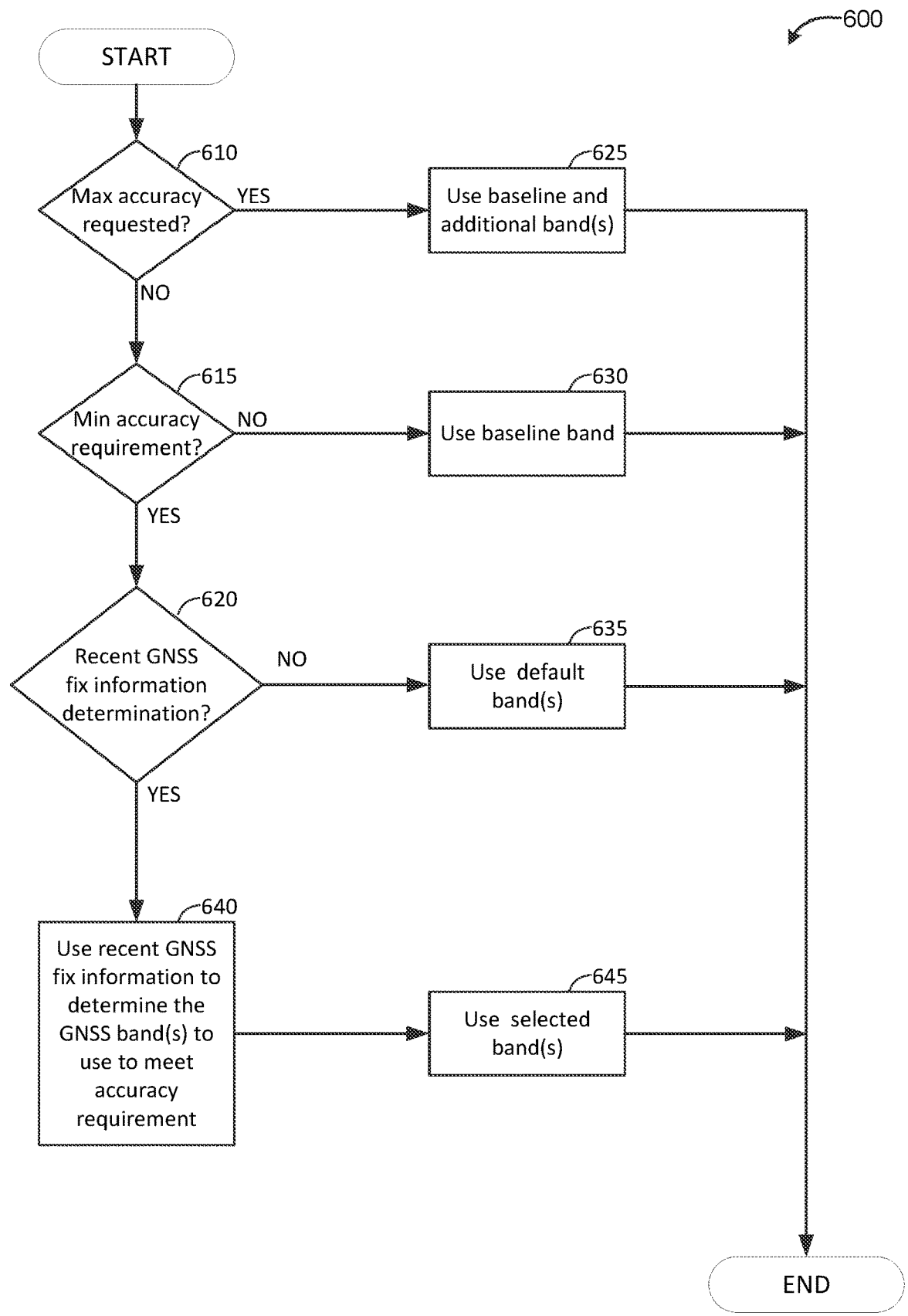
FIG. 6 is a flow diagram of a first process that a GNSS receiver may perform to determine which GNSS bands to use to determine GNSS position fix information, according to an embodiment.
Figure 7:
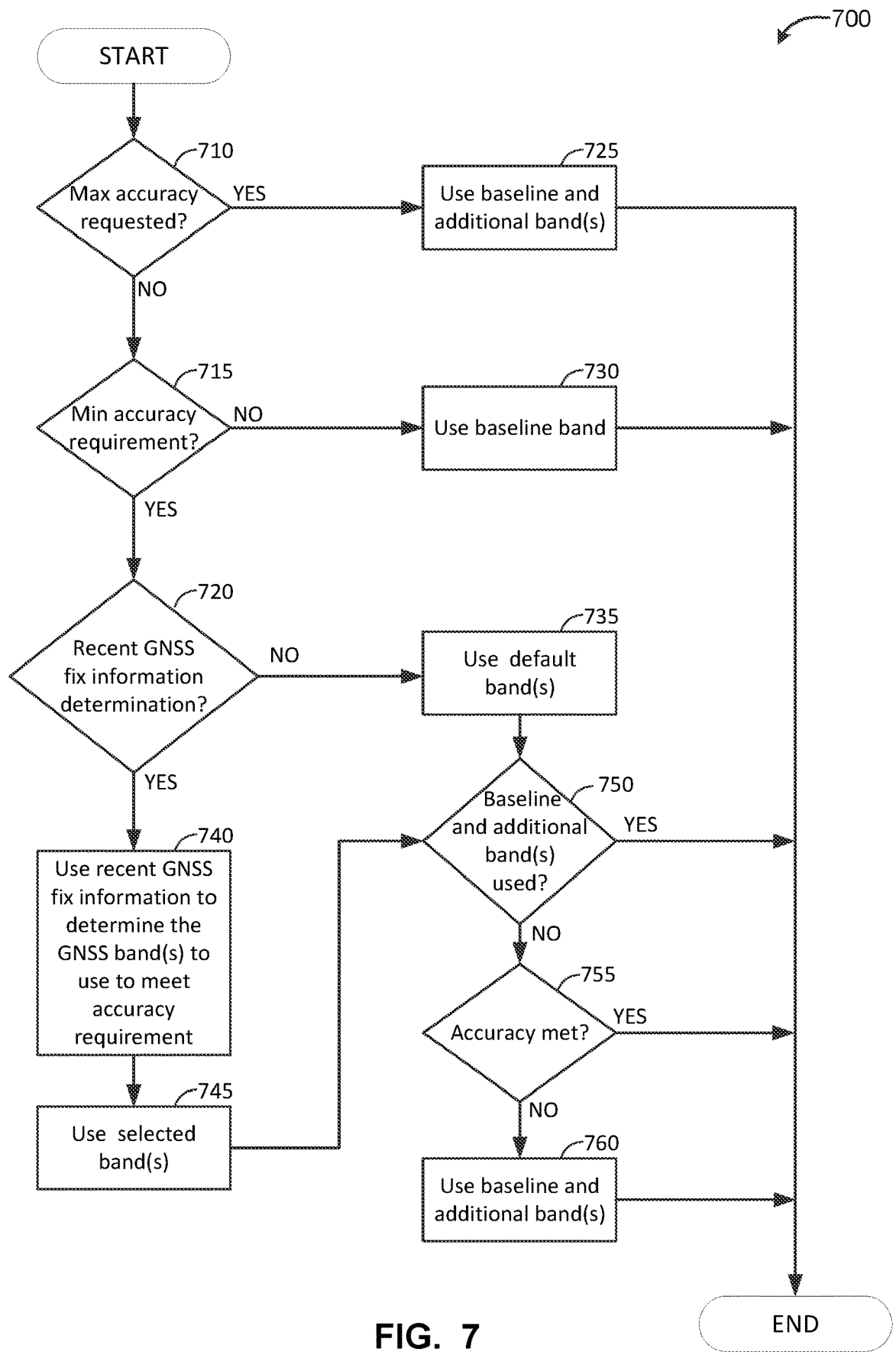
FIG. 7 is a flow diagram of a second process that a GNSS receiver may perform to determine which GNSS bands to use to determine GNSS position fix information, according to an embodiment.
Figure 8:
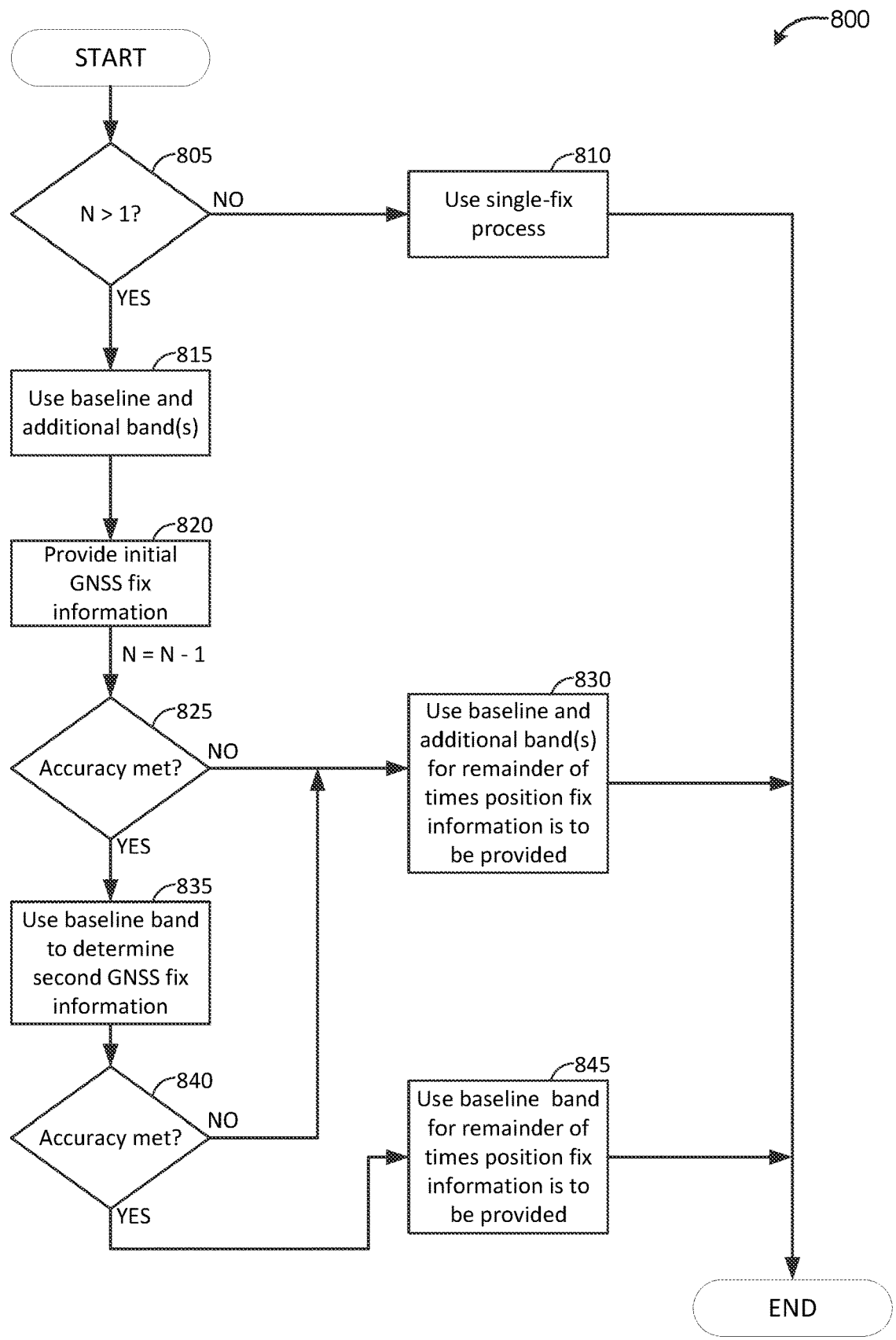
FIG. 8 is a flow diagram of a third process that a GNSS receiver may perform to determine which GNSS bands to use to determine GNSS position fix information, according to an embodiment.

FIGS. 6-8 are flow diagrams illustrating processes that a GNSS receiver may perform to determine which GNSS bands to use to determine GNSS position fix information. In the process illustrated in FIG. 5, for example, the GNSS receiver 510 may perform one of the processes shown in FIGS. 6-8 at block 525.

FIG. 6 is a flow diagram of a first process 600 that a GNSS receiver may perform to determine which GNSS bands to use to determine GNSS position fix information, according to an embodiment. Means for performing the functionality illustrated in FIG. 6 may comprise processing and/or other logic circuitry, which may be communicatively coupled with GNSS signal receiving and processing circuitry (e.g., the signal processing architecture 400 of FIG. 4), and further capable of powering RF chains on or off as previously described, depending on which GNSS bands are chosen to determine GNSS position fix information. Such processing/logic circuitry, together with the GNSS signal receiving and processing circuitry, may be included in a single GNSS receiver IC/chip, module, package, or subassembly, or a combination thereof, which may be incorporated into a mobile device also comprising an application processor (e.g. application processor 505 of FIG. 5). It can be noted that, as with other figures provided herein, FIG. 6 is provided as a non-limiting example. Alternative embodiments may alter and/or rearrange functions of the first process 600 to provide a similar affective functionality.

The process 600 may include a series of checks, illustrated at blocks 610, 615, and 620 (which may be performed in a different order in alternative embodiments) which serve to determine the type of accuracy requirement included in the GNSS position fix information request received from the application processor, enabling the GNSS receiver to use the process 600 to respond accordingly.

At block 610, the first check comprises a determination of whether a maximum accuracy has been requested by the application processor. As previously noted, an accuracy requirement comprising a maximum accuracy request by the application processor may cause the GNSS receiver to provide the most accurate GNSS position fix information possible. Thus, if the accuracy requirement comprises a maximum accuracy request, the process 600 may then proceed to the functionality at block 625, in which the baseline GNSS band is used, as well as one or more additional GNSS bands. Here, the "baseline" GNSS band may comprise a GNSS band used by the GNSS receiver for all GNSS position fix information determinations. In the previously-described example, for instance, the baseline GNSS band may comprise GPS L1. In this case, the additional bands may comprise the use of GNSS band L5, L2, or both (if available).

If the accuracy requirement does not comprise a maximum accuracy request, the process 600 may perform the functionality at block 615, in which a determination is made of whether the accuracy requirement includes a minimum accuracy. If not, the GNSS receiver can use the baseline GNSS band, as indicated at block 630. In many GPS applications, this may comprise GPS L1, given that the use of GPS L1 is most commonly used among manufacturers and may provide a high degree of accuracy for a single band. That said, alternative embodiments may use other bands as the baseline band for GNSS position fix information determinations.

If there is a minimum accuracy requirement, the process 600 may proceed to the functionality at block 620, in which a determination is made of whether there has been a recent GNSS fix information determination (e.g., a recent GNSS position fix and/or determination of GNSS pseudoranges). This determination is made because recent GNSS fix information may be used as reference point of how accurate positioning fix information using one or more GNSS bands may be, as described in more detail hereafter with regard to the functionality at block 640. As previously indicated, a GNSS fix information may be determined to be "recent" if it has been determined within a threshold amount of time and/or if the mobile device has moved less than a threshold amount of distance since the previous GNSS fix information determination. For example, a GNSS fix information determination that is 10 seconds old may still be relevant for a stationary or slow-moving device, but it may not be relevant for a device in a vehicle moving at freeway speeds.

If recent GNSS fix information is not available, the process 600 may move to block 635, in which the GNSS receiver uses one or more default bands to determine the requested GNSS positioning fix information. Here, the default bands may comprise the baseline GNSS band used at block 630 to provide relatively low-accuracy fix information, the GNSS bands used at block 625 to provide relatively high-accuracy fix information, or something in between (e.g., if three bands are used at block 625, and a single band is used at block 630, then to bands may be used at block 635).

The default bands at block 635 may vary, depending on desired functionality. For embodiments in which power savings is favored over accuracy, the default band(s) used at block 635 may comprise only the baseline band used at block 630. On the other hand, for embodiments in which accuracy is favored over power savings, the default bands used at block 635 may comprise the baseline and additional band(s) used at block 625. Alternatively, a balanced approach may comprise a subset of the baseline and additional band(s) may be used in cases where the subset comprises more than the baseline band.

Further, according to some embodiments, the default band(s) may be determined based on input from an application processor. For example, the application processor may send the GNSS receiver a command to operate in a power savings mode. While operating in the power savings mode, the GNSS receiver may use only the baseline band as the default band(s) at block 635. Additionally or alternatively, the application processor may send the GNSS receiver a command to operate in a high-accuracy mode. While operating in the high-accuracy mode, the GNSS receiver may use the baseline and additional band(s) as the default band(s) at block 635. Further, according to some embodiments, an application processor may utilize machine learning to determine a relationship between accuracy and power savings (e.g., in view of results from the power savings and/or high-accuracy modes, as well as other factors such as mobile device movement, recent positioning fix information determinations, location, and the like).

According to some embodiments, a power savings mode may include occasionally using one or more additional GNSS bands to obtain error correction for single-band GNSS determinations. For example, a GNSS receiver may occasionally use an additional GNSS band, in addition to the baseline GNSS band, to obtain ionosphere and/or tropospheric error. This error may remain valid for a period of time (the length of which may be dependent on accuracy requirements for a position fix), during which the GNSS receiver may perform single-band position information determinations using the baseline GNSS band. The accuracy of such single-band position fix information determinations may be increased due to error correction based on the ionosphere and/or tropospheric error. After the validity of the ionosphere and/or tropospheric error lapses, the GNSS receiver may again use one or more additional GNSS bands to obtain new ionosphere and/or tropospheric error. Thus, according to some embodiments, the process 600 may include a determination of whether ionosphere and/or tropospheric error is still valid before determining default band(s) at block 635.

If a recent GNSS fix information determination is available, the process 600 may proceed to the functionality at block 640, in which the recent GNSS fix information can be used to determine the GNSS band(s) to use to meet the accuracy requirement. Because accuracy using the baseline GNSS band may vary over time (e.g., based on signal quality, number of visible satellites, etc.), there may be situations in which using only the GNSS baseline band may be sufficient to satisfy an accuracy requirement at one point in time, but insufficient to satisfy the same accuracy requirement at another point in time. However, these changes may be gradual, so a recent GNSS fix information using the baseline band and one or more additional bands can be used as a data point to determine whether the accuracy requirement may be met. For example, if a recent GNSS fix using only the baseline GNSS band results in an error estimate that would satisfy a subsequently-received accuracy requirement, then the GNSS receiver may determine to use only the baseline GNSS band, given the likelihood that it will result in an accuracy similar to the recent GNSS fix. On the other hand, if the recent GNSS fix using only the baseline GNSS band results in an accuracy below the subsequently-received accuracy requirement, the GNSS receiver may choose to use one or more additional GNSS bands to satisfy the accuracy requirement. A recent position fix using one or more GNSS bands in addition to the baseline GNSS band can be leveraged similarly. At block 645, the process 600 comprises using the GNSS band(s) selected at block 640.

The process 600 illustrated in FIG. 6 illustrates an example process a GNSS receiver may perform when providing GNSS position information in a single instance. However, the process can be adaptive, as previously noted. That is, based on an accuracy of initial position fix information, subsequent position fix information determinations may adapt accordingly to meet an accuracy requirement. This adaptation may be performed at the GNSS receiver and/or at the application processor.

FIG. 7 illustrates a second process 700 that a GNSS receiver may perform to determine which GNSS bands to use for determining GNSS position fix information, according to an embodiment. Here, the process 700 is variation of the process 600 of FIG. 6. The functionality at blocks 710-745 may echo the functionality at corresponding blocks 610-645 of FIG. 6, previously described. Here, however, an additional check may be made in cases where the accuracy requirement includes a specified minimum accuracy. The GNSS receiver may perform an initial position fix information determination using the GNSS band(s) selected at block 735 or 745 and then determine whether accuracy needs to be increased using the functionality at block 750-760. At block 750, a determination is made of whether the baseline GNSS band and the additional GNSS band(s) are used, indicating whether additional accuracy is available. If they were used, additional accuracy is not available, and the GNSS receiver can return the position fix information. If not, however, the GNSS receiver may determine whether the GNSS position fix information met the accuracy requirement, as indicated at block 755. If so, the GNSS receiver may return the GNSS position fix information. If not, however, the process 700 may proceed to block 760, in which case the baseline GNSS band and additional one or more GNSS bands may be used to provide more accurate position fix information, which can then be provided to the application processor by the GNSS receiver. Thus, the GNSS receiver may perform a preliminary check of whether GNSS position fix information has met an accuracy requirement before providing the GNSS position fix information. If not, the GNSS receiver can increase the number of GNSS bands used to provide more accurate position fix information then provide the more accurate GNSS position fix information to the application processor.

It can be noted, however, that additional variations may be made to the process 700. For example, if a GNSS receiver is capable of using three or more GNSS bands, the process 700 may be modified to accommodate incremental increases or decreases in the number of bands to accommodate incremental increase or decrease in accuracy. Alternative embodiments may include additional or alternative functions for functionality of increasing or decreasing accuracy based on a preliminary accuracy check of GNSS position fix information by the GNSS receiver prior to providing the GNSS position fix information to the application processor.

FIG. 8 is a flow diagram illustrating a third process 800 that a GNSS receiver may perform to determine which GNSS bands to use when determining GNSS position fix information, according to an embodiment. This process 800 may be used in cases where the application processor requests that the GNSS processor provide position fix information at one or more times subsequent to providing initial GNSS position fix information. Such a request may be included in an initial GNSS position fix information request (e.g., as shown at arrow 520 of FIG. 5), and may indicate a number of times GNSS position information is to be provided, as well as timing (e.g., a periodicity) for providing the GNSS position fix information. An application processor may provide such a request in cases ongoing positioning of a mobile device over a window of time may be desirable. Similar to the process 700 of FIG. 7, providing GNSS position fix information at multiple times can enable a GNSS processor to perform adaptive selection of GNSS bands, based on previous position fix information.

The process 800 may begin at with the functionality of block 805, where the GNSS receiver determines, for a position fix information request received by an application processor, whether a number of times position fix information is to be provided, N, is greater than one. If not, the GNSS receiver may perform a single-fix process, as indicated at block 810. This single-fix-information process in this case may comprise a process similar to the process 600 of FIG. 6 or the process 700 of FIG. 7 in which GNSS position fix information is provided a single time to the application processor after the GNSS receiver determines which GNSS bands to use. (Although the GNSS receiver may determine GNSS position fix information more than once in the process 700, it may ultimately provide GNSS position fix a single time (e.g., to an application processor), and therefore may be referred to as a "single-fix-information process" in this context.) If N is greater than one, the process may proceed to the functionality at block 815, in which the GNSS receiver uses the baseline GNSS band and the one or more additional GNSS bands to determine initial GNSS position fix information. The initial GNSS position fix information can then be provided to the application processor, as indicated at block 820. This reduces the number of remaining times position fix information is to be provided, N, by one.

The remainder of the process 800 can be informed by whether the initial GNSS position fix information met a desired accuracy. A block 825, a determination is made of whether the accuracy was met. This can be done at the GNSS receiver determining whether an error estimate of the GNSS position fix information satisfies an accuracy requirement (as previously described). Additionally or alternatively, the application processor may provide feedback after the position fix information is used regarding whether the accuracy was satisfactory or not. That is, after making an ultimate location determination (e.g., using a positioning engine to fuse multiple positioning sources) the application processor may send a message to the GNSS receiver to indicate whether accuracy was satisfactory or insufficient. If the accuracy was satisfactory, the application processor may indicate whether a lower accuracy may be allowable.

If accuracy was not met, the process 800 can proceed to the functionality at block 830, in which the GNSS receiver uses the baseline and one or more additional GNSS bands for the remaining N times position fix information is to be provided.

If the accuracy was met, the GNSS receiver may attempt to use only the baseline GNSS band to determine second GNSS position fix information, as indicated at block 835, to see whether GNSS fix information using only the baseline GNSS band provide sufficient accuracy. This ultimately can allow the GNSS receiver to determine whether it can use fewer bands (and lower power) to satisfy the accuracy requirements for the remaining N times position fix information is to be provided.

At block 840, a determination is made of whether accuracy of the second GNSS position fix information is met. Here, the GNSS position fix information is based on the baseline band used at block 835. Similar to block 825, the determination at block 840 may be made by the GNSS receiver and/or application processor. In some embodiments, the GNSS receiver may make the determination without providing the second GNSS position fix information. In some embodiments, the GNSS receiver may provide the second GNSS position fix information to the application processor, which can then provide feedback to the GNSS receiver regarding whether the accuracy was satisfactory or insufficient. (If the GNSS receiver provides the second GNSS position fix information to the application processor, the value of N again may be decremented by one.) In either case, if the accuracy is insufficient, the GNSS receiver can then perform the functionality at block 830, using the baseline and one or more additional GNSS bands for the remainder of the N times position fix information is to be provided. If the accuracy is met, the GNSS receiver can perform the functionality at block 845, in which the baseline band is used for the remainder of the N times position fix information is to be provided.

Alternative embodiments may employ any number of variations to the process 800, depending on desired functionality. For example, rather than starting with baseline and one or more additional bands at block 815, the process 800 may start with a baseline band and increase the number of bands, if needed, based on whether accuracy is met. Additionally or alternatively, according to some embodiments, rather than using a set number of bands at block 830 or 845 further remainder of times position fix information is to be provided, the GNSS receiver may reassess whether an increased or decreased number of GNSS bands should be used after each time position fix information is provided.

It can be noted that, as mentioned with regard to FIG. 7, the functionality illustrated in FIG. 8 can be expanded to accommodate the GNSS receiver using any number of GNSS bands. That is, rather than two options (using either (i) the baseline GNSS band alone, or (ii) the baseline GNSS band with one or more additional GNSS bands), there may be three or more options for GNSS band usage of which the GNSS is capable (e.g., based on capabilities of the GNSS receiver to power on/off different RF chains). Such embodiments may incur meant or decrement a number of GNSS bands used based on whether GNSS position fix information satisfies accuracy requirements, in a manner similar to the process 800 of FIG. 8.

It can further be noted that, according to some embodiments, the application processor may adjust an accuracy requirement of subsequent GNSS position fix information based on whether accuracy is satisfied. That is, if an a GNSS receiver is unable to provide a GNSS position fix information that satisfies an accuracy requirement requested by the application processor, the application processor may be able to reduce the accuracy requirement. For example, the application processor may indicate to an application executed by the application processor that a high degree of accuracy is currently infeasible, in which case the application requesting the mobile device's location may reduce its accuracy expectations (operating in a reduced-accuracy mode, for example) which, in turn, may allow the application processor to reduce the accuracy requirement in subsequent GNSS position fix information requests. The application processor may continue to include a reduced accuracy requirement in subsequent GNSS position fix information requests for a predetermined period of time, until the mobile device is determined to have moved a threshold distance, and/or a similar event occurs in which conditions may have changed sufficient to allow a higher-accuracy GNSS position fix information. During this time, the application processor may seek to obtain positioning information from other positioning sources (e.g., cellular-based positioning, motion sensors, etc.) to enable a location determination with relative high accuracy, despite the reduced-accuracy GNSS position fix information from the GNSS receiver.

Figure 9:
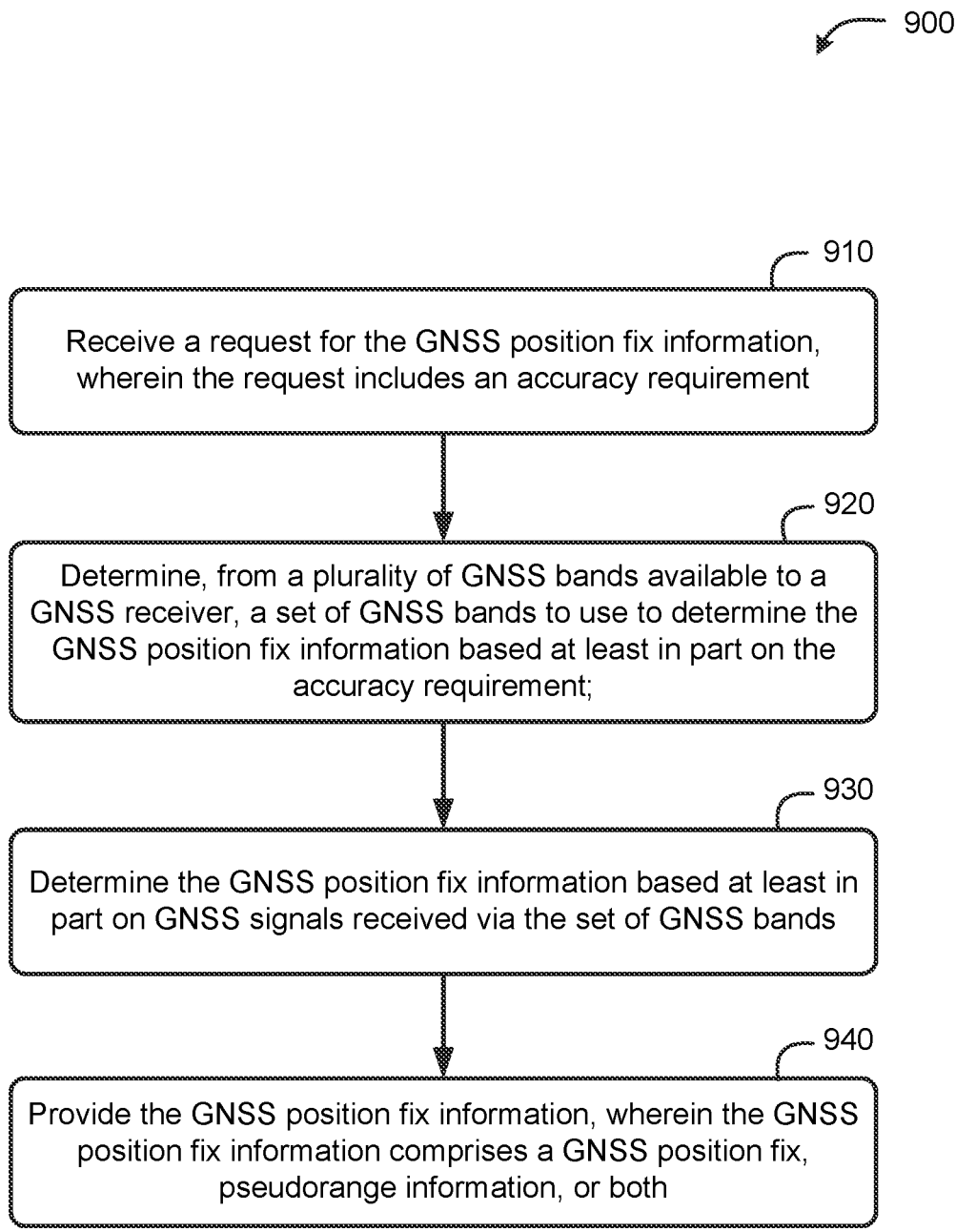
FIG. 9 is a flow diagram of a method of providing GNSS position fix information, according to an embodiment.
Figure 10:
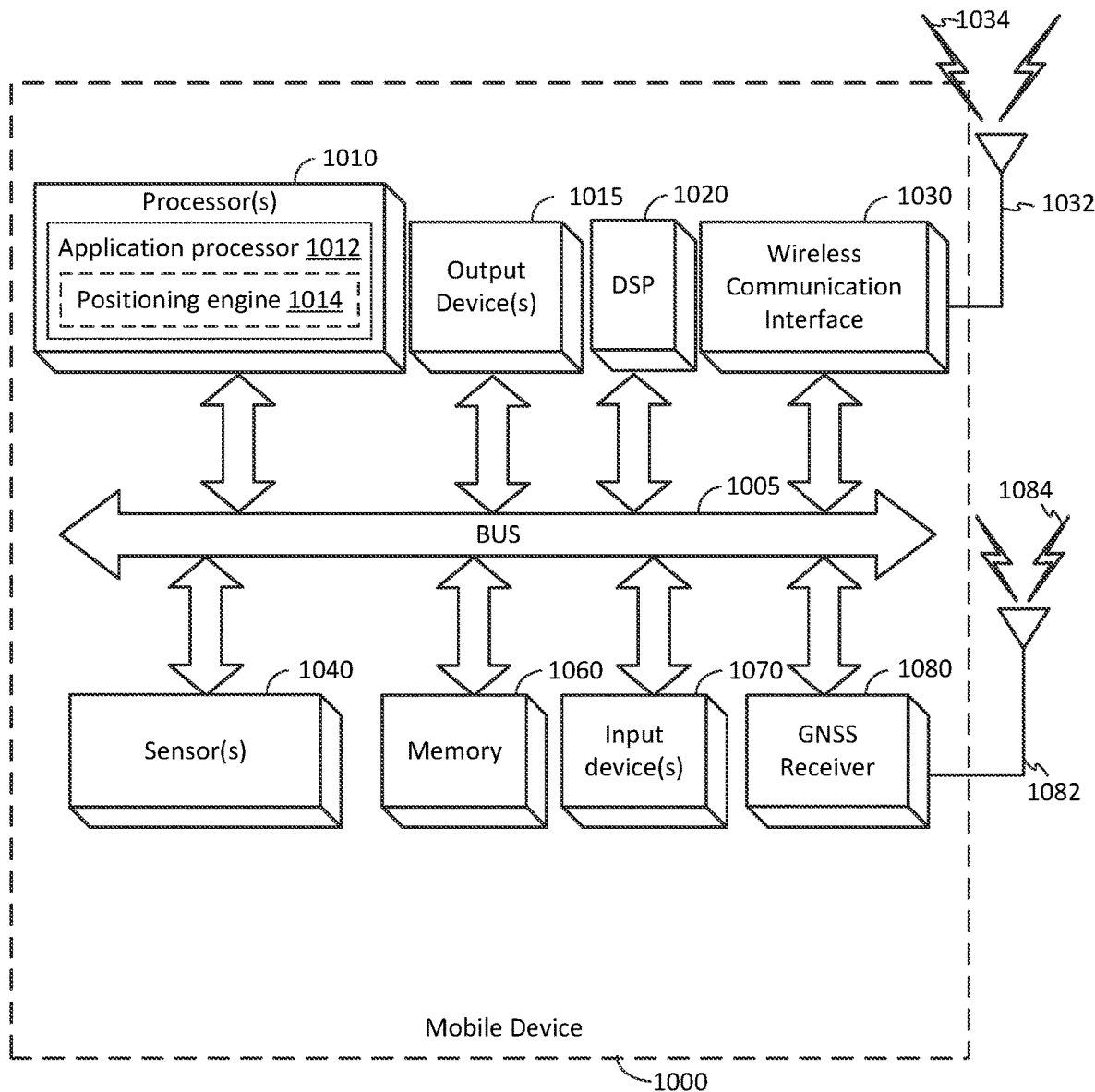
FIG. 10 is a block diagram of an embodiment of a mobile device, which can be utilized in embodiments as described herein.

FIG. 9 is a flow diagram of a method 900 of providing GNSS position fix information, according to an embodiment. Means for performing the functionality illustrated in one or more of the blocks shown in FIG. 9 may be performed by hardware and/or software components of an apparatus comprising a GNSS receiver. In some embodiments, the functionality may be performed by the GNSS receiver, an application processor (e.g., executing a positioning engine) in communication with a GNSS receiver, a separate electrical component of the apparatus, or any combination thereof. Specifically, in some embodiments, the functionality may be performed by a GNSS receiver. As noted, an application processor and GNSS receiver may be integrated into a mobile device. Example components of a mobile device are illustrated in FIG. 10, which is described in more detail below.

At block 910, the functionality comprises receiving a request for the GNSS position fix information, wherein the request includes an accuracy requirement. As previously discussed with respect to FIG. 5, the request for the GNSS position fix may be received (e.g., by a GNSS receiver) from an application processor. The request may be triggered, for example, by an application executed by the application processor, a positioning request from a remote device, a user input, or any combination thereof. Means for performing the functionality at block 910 may comprise a bus 1005, GNSS receiver 1080, and/or other components of a mobile device 1000, as illustrated in FIG. 10 and described hereafter.

At block 920, the functionality comprises determining, from a plurality of GNSS bands available to a GNSS receiver, a set of GNSS bands to use for the GNSS position fix based at least in part on the accuracy requirement. According to some embodiments, this determining may comprise selecting the set of GNSS bands from the plurality of GNSS bands available to the GNSS receiver, in a manner to meet the accuracy requirement. As indicated elsewhere herein, a GNSS receiver may be capable of performing a GNSS positioning fix using a plurality of bands, including bands from GNSS constellations such as GPS, BDS, GAL, GLO, and the like. Each of these constellation may have multiple bands with which a GNSS receiver may determine a GNSS positioning fix. At a given time, such as when a GNSS receiver receives a GNSS position fix request, the GNSS receiver may be capable of receiving signals from various satellites visible to the GNSS receiver (i.e., satellites transmitting GNSS signals that are receivable and usable by the GNSS receiver), which are transmitted via various GNSS bands. Further, as previously noted, the GNSS receiver may be capable of powering on/off RF chains capable of receiving GNSS signals via the plurality of GNSS bands, and thereby capable of powering down unused RF chains corresponding to unselected GNSS bands, ultimately saving power (e.g., versus using all GNSS as bands). Thus, according to some embodiments of the method 900, the GNSS receiver has a plurality of receiver chains, each receiver chain for receiving one or more GNSS bands of the of the plurality of GNSS bands, and wherein each receiver chain is selectively activated or deactivated based on the set of GNSS bands so that the receiver is able to receive the set of GNSS bands.

As indicated with regard to FIGS. 6 and 7, different types of accuracy requirements may evoke different GNSS band selections by the GNSS receiver. If the accuracy requirement comprises an indication that a maximum accuracy is requested, for example, the set of GNSS bands may comprise two or more (e.g., all) GNSS bands of the plurality of GNSS bands available to the GNSS receiver. If accuracy requirement comprises an indication that no minimum accuracy is needed, for example, the set of GNSS bands may comprise a single GNSS band. As noted, a baseline GNSS band (e.g., if available) may be selected for all GNSS position fixes made by the GNSS receiver. If a GNSS receiver determines that additional GNSS as bands may need to be used, the GNSS receiver may then determine one or more bands to use in addition to the baseline GNSS band. Thus, according to some embodiments of the method 900, the set of GNSS bands comprises at least a baseline GNSS band. According to some embodiments, the baseline band comprises the GPS L1 band. Additionally or alternatively, the set of GNSS bands comprises one or more additional GNSS bands. The one or more additional GNSS bands may comprise, for example, the GPS L5 band, the GPS L2 band, or both. For unselected GNSS bands, the GNSS receiver may power down or power off corresponding circuitry (e.g., RF chains) to save power.

Means for performing the functionality at block 920 may comprise a GNSS receiver 1080, and/or other components of a mobile device 1000, as illustrated in FIG. 10 and described hereafter. Additionally or alternatively, means for performing the functionality at block 920 may comprise one or more components of a GNSS receiver, such as those illustrated in FIG. 4.

At block 930, the functionality comprises obtaining the GNSS position fix (e.g., with the GNSS receiver) based at least in part on GNSS signals received via the set of GNSS bands. As previously indicated, this may comprise receiving and processing the GNSS signals using one or more antennas and circuitry corresponding to each band of the set of GNSS bands. As indicated with respect to FIG. 7, for example, the GNSS receiver may make a preliminary or initial GNSS position fix to determine whether the set of GNSS bands result in a GNSS position fix that satisfies the accuracy requirement. This may comprise testing whether a single, baseline GNSS band is sufficient and, if not, increasing the number of GNSS to use for a GNSS position fix. Accordingly, for some embodiments of the method 900, determining which GNSS bands to use to determine the GNSS position fix information comprises obtaining an initial GNSS position fix using a single GNSS band, determining that an accuracy of the initial GNSS position fix is insufficient to satisfy the accuracy requirement, and, responsive to determining that the accuracy of the initial GNSS position fix is insufficient to satisfy the accuracy requirement, determining two or more GNSS bands as the set of bands for determining the GNSS position fix.

Additionally or alternatively, GNSS position information may be determined and provided for a plurality of times (e.g., periodically), as indicated in FIG. 8. In such instances, the request for the GNSS position fix information may comprise a request for GNSS position fix information for a plurality of times and determining the set of GNSS bands for the GNSS position fix information may comprise selecting two or more GNSS bands of the plurality of GNSS bands available to the GNSS receiver for first GNSS position fix information. Further, determining the GNSS position fix information may comprise determining the first GNSS position fix information, and providing the GNSS position fix information may comprise providing the first GNSS position fix information. For example, the first GNSS position fix information may be the initial GNSS position fix information mentioned in the process 800 of FIG. 8. According to some embodiments, the method 900 may further comprise, responsive to a determination that the first GNSS position fix information satisfies the accuracy requirement for a first time of the plurality of times, obtaining, for a second time of the plurality of times, second GNSS position fix information using a single GNSS band. According to some embodiments, the method 900 may further comprise, responsive to a determination that the second GNSS position fix information satisfies the accuracy requirement, obtaining, for a third time of the plurality of times, third GNSS position fix information using the single GNSS band. Responsive to a determination that the second GNSS position fix information does not satisfy the accuracy requirement, the method may comprise obtaining, for a third time of the plurality of times, third GNSS position fix information using the two or more GNSS bands used to determine the first GNSS position fix information.

Means for performing the functionality at block 930 may comprise a bus 1005, GNSS receiver 1080, GNSS antenna(s) 1082, and/or other components of a mobile device 1000, as illustrated in FIG. 10 and described hereafter. Additionally or alternatively, means for performing the functionality at block 930 may comprise one or more components of a GNSS receiver, such as those illustrated in FIG. 4.

At block 940, the functionality comprises providing the GNSS position fix, wherein the GNSS position fix information comprises a GNSS position fix, pseudorange information, or both. Again, this functionality may be performed, for example, with the GNSS receiver. As noted, this may be done in an exchange between the GNSS receiver and the application processor. In particular, according to some embodiments of the method 900, receiving the request for the GNSS position fix may comprise receiving the request for the GNSS position fix from an application processor, and providing the GNSS position fix may comprise providing the GNSS position fix to the application processor.

Means for performing the functionality at block 940 may comprise a bus 1005, GNSS receiver 1080, and/or other components of a mobile device 1000, as illustrated in FIG. 10 and described hereafter.

FIG. 10 is a block diagram of an embodiment of a mobile device 1000, which can be utilized as described herein above (e.g., in association with FIGS. 1-9. For example, the mobile device 1000 can corresponds to mobile device 105 of FIG. 1, and may comprise a GNSS receiver and application processor as described herein. It should be noted that FIG. 10 is meant only to provide a generalized illustration of various components, any or all of which may be utilized as appropriate. In other words, because mobile devices can vary widely in functionality, they may include only a portion of the components shown in FIG. 10. It can be noted that, in some instances, components illustrated by FIG. 10 can be localized to a single physical device and/or distributed among various networked devices, which may be disposed at different physical locations.

The mobile device 1000 is shown comprising hardware elements that can be electrically coupled via a bus 1005 (or may otherwise be in communication, as appropriate). The hardware elements may include a processor(s) 1010 which can include without limitation one or more general-purpose processors (e.g., an application processor), one or more special-purpose processors (such as digital signal processor (DSP) chips, graphics acceleration processors, application specific integrated circuits (ASICs), and/or the like), and/or other processing structures or means. Processor(s) 1010 may comprise one or more processing units, which may be housed in a single integrated circuit (IC) or multiple ICs. Processor(s) 1010 may further comprise an application processor 1012, as described in the embodiments above, which may execute a positioning engine 1014. As noted, the positioning engine 1014 may use a GNSS position fix from the GNSS receiver 1080 and/or information from other positioning sources (e.g., sensors 1040) to determine a location of the mobile device 1000. As shown in FIG. 10, some embodiments may have a separate DSP 1020, depending on desired functionality. Location determination and/or other determinations based on wireless communication may be provided in the processor(s) 1010 and/or wireless communication interface 1030 (discussed below). The mobile device 1000 also can include one or more input devices 1070, which can include without limitation one or more keyboards, touch screens, touch pads, microphones, buttons, dials, switches, and/or the like; and one or more output devices 1015, which can include without limitation one or more displays (e.g., touch screens), light emitting diodes (LEDs), speakers, and/or the like.

The mobile device 1000 may also include a wireless communication interface 1030, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX™ device, a WAN device, and/or various cellular devices, etc.), and/or the like, which may enable the mobile device 1000 to communicate with other devices as described in the embodiments above. The wireless communication interface 1030 may permit data and signaling to be communicated (e.g., transmitted and received) with, for example, base stations, access points, and/or other access node types, and/or other network components, computer systems, and/or any other electronic devices communicatively coupled a wireless communication network. The communication can be carried out via one or more wireless communication antenna(s) 1032 that send and/or receive wireless signals 1034. According to some embodiments, the wireless communication antenna(s) 1032 may comprise a plurality of discrete antennas, antenna arrays, or any combination thereof. The antenna(s) 1032 may be capable of transmitting and receiving wireless signals using beams (e.g., Tx beams and Rx beams). Beam formation may be performed using digital and/or analog beam formation techniques, with respective digital and/or analog circuitry. The wireless communication interface 1030 may include such circuitry.

Depending on desired functionality, the wireless communication interface 1030 may comprise a separate receiver and transmitter, or any combination of transceivers, transmitters, and/or receivers to communicate with base stations and other terrestrial transceivers, such as wireless devices and access points. The mobile device 1000 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000®, WCDMA, and so on. CDMA2000® includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. CDMA2000® is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The mobile device 1000 can further include sensor(s) 1040. Sensor(s) 1040 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used as positioning data sources and/or to obtain other position-related measurements and/or other information.

Embodiments of the mobile device 1000 may also include a GNSS receiver 1080 capable of receiving signals 1084 from one or more GNSS satellites via one or more GNSS bands using GNSS antenna(s) 1082. The GNSS receiver 1080 of FIG. 10 may correspond to the GNSS receiver described in previous embodiments, including the GNSS receiver 400 of FIG. 4. and as such, the GNSS receiver 1080 of FIG. 10 may comprise components illustrated in FIG. 4 and described above. The GNSS receiver 1080 may therefore be used to provide GNSS position fixes based on received GNSS signals 1084 using, for example, the signal processing architecture 400 of FIG. 4 and/or similar processing components. The GNSS receiver 1080 may be capable of processing signals received via many GNSS bands/constellations. In some embodiments, the GNSS receiver 1080 may include front-end analog components for each GNSS band (or for pairs of GNSS bands having similar baseband frequencies), and may share digital circuitry (e.g., complex down-conversion and digital baseband 416 of FIG. 4) among multiple GNSS bands. Additionally or alternatively, digital circuitry may be separate for each GNSS band. The GNSS receiver 1080 may communicate with other components of the mobile device 1000 (e.g., processor(s) 1010, including application processor 1012 and/or positioning engine 1014) via a data interface with the bus 1005.

The GNSS receiver 1080 can extract a position of the mobile device 1000, using conventional techniques, from GNSS satellites 110 of a GNSS system, such as GPS, Galileo, GLONASS, Quasi-Zenith Satellite System (QZSS) over Japan, IRNSS over India, BeiDou Navigation Satellite System (BDS) over China, and/or the like. Moreover, the GNSS receiver 1080 can be used with various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein a GNSS may include any combination of one or more global and/or regional navigation satellite systems and/or augmentation systems, and GNSS signals may include GNSS, GNSS-like, and/or other signals associated with such one or more GNSS.

It can be noted that, although GNSS receiver 1080 is illustrated in FIG. 10 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processors, such as processor(s) 1010, DSP 1020, and/or a processor within the wireless communication interface 1030 (e.g., in a modem). A GNSS receiver may optionally also include a GNSS positioning engine, which can use GNSS measurements from the measurement engine to determine a position of the GNSS receiver (e.g., a position fix) using an Extended Kalman Filter (EKF), Weighted Least Squares (WLS), a hatch filter, particle filter, or the like. The GNSS positioning engine may also be executed as part of a larger processing engine e.g., positioning engine 1014 executed by application processor 1012.

The mobile device 1000 may further include and/or be in communication with a memory 1060. The memory 1060 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1060 of the mobile device 1000 also can comprise software elements (not shown in FIG. 10), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the functionality discussed above may be implemented as code and/or instructions executable by the mobile device 1000 (e.g., using processor(s) 1010). In some embodiments, then, such code and/or instructions can be used to configure and/or adapt a general-purpose computer (or other device) to perform one or more operations in accordance with the described methods.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method of providing Global Navigation Satellite System (GNSS) position fix information, the method comprising: receiving a request for the GNSS position fix information, wherein the request includes an accuracy requirement; determining, from a plurality of GNSS bands available to a GNSS receiver, a set of GNSS bands to use to determine the GNSS position fix information based at least in part on the accuracy requirement; and determining the GNSS position fix information based at least in part on GNSS signals received via the set of GNSS bands; and providing the GNSS position fix information, wherein the GNSS position fix information comprises a GNSS position fix, pseudorange information, or both.

Clause 2. The method of clause 1, wherein: the accuracy requirement comprises an indication that a maximum accuracy is requested; and the set of GNSS bands comprises two or more GNSS bands of the plurality of GNSS bands available to the GNSS receiver.

Clause 3. The method of clause 1 wherein the accuracy requirement comprises an indication that no minimum accuracy is needed; and the set of GNSS bands comprises a single GNSS band.

Clause 4. The method of clause 1 wherein the accuracy requirement comprises a maximum allowable error estimate for the GNSS position fix information.

Clause 5. The method of any one of clauses 1 or 3-4 wherein determining the set of GNSS bands to use to determine the GNSS position fix information comprises: obtaining initial GNSS position fix information using a single GNSS band; determining that an accuracy of the initial GNSS position fix information is insufficient to satisfy the accuracy requirement; and responsive to determining that the accuracy of the initial GNSS position fix information is insufficient to satisfy the accuracy requirement, determining two or more GNSS bands as the set of GNSS bands.

Clause 6. The method of any one of clauses 1-5 wherein the request for the GNSS position fix information comprises a request for GNSS position fix information for a plurality of times; determining the set of GNSS bands for the GNSS position fix information comprises determining two or more GNSS bands of the plurality of GNSS bands available to the GNSS receiver for first GNSS position fix information; determining the GNSS position fix information comprises determining the first GNSS position fix information; and providing the GNSS position fix information comprises providing the first GNSS position fix information; wherein the method further comprises, responsive to a determination that the first GNSS position fix information satisfies the accuracy requirement for a first time of the plurality of times, obtaining, for a second time of the plurality of times, second GNSS position fix information using a single GNSS band.

Clause 7. The method of any one of clauses 1-6 wherein the method further comprises, responsive to a determination that the second GNSS position fix information satisfies the accuracy requirement, obtaining, for a third time of the plurality of times, third GNSS position fix information using the single GNSS band.

Clause 8. The method of any one of clauses 1-7 wherein the method further comprises, responsive to a determination that the second GNSS position fix information does not satisfy the accuracy requirement, obtaining, for a third time of the plurality of times, third GNSS position fix information using the two or more GNSS bands used to determine the first GNSS position fix information.

Clause 9. The method of any one of clauses 1-8 wherein receiving the request for the GNSS position fix information comprises receiving the request for the GNSS position fix information from an application processor; and providing the GNSS position fix information comprises providing the GNSS position fix information to the application processor.

Clause 10. The method of any one of clauses 1-9 wherein the set of GNSS bands comprises at least a baseline GNSS band.

Clause 11. The method of clause 10 wherein the baseline GNSS band comprises the Global Positioning System (GPS) L1 band.

Clause 12. The method of any one of clauses 10-11 wherein the set of GNSS bands comprises one or more additional GNSS bands.

Clause 13. The method of clause 12 wherein the one or more additional GNSS bands comprise the GPS L5 band, the GPS L2 band, or both.

Clause 14. The method of any one of clauses 1-13 wherein determining the set of GNSS bands to use to determine the GNSS position fix information based at least in part on the accuracy requirement comprises selecting the set of GNSS bands from the plurality of GNSS bands available to the GNSS receiver.

Clause 15. The method of any one of clauses 1-14 wherein the GNSS receiver determines the GNSS position fix information and provides the GNSS position fix information.

Clause 16. The method of any one of clauses 1-15 where the GNSS receiver has a plurality of receiver chains, each receiver chain for receiving one or more GNSS bands of the of the plurality of GNSS bands, and wherein each receiver chain is selectively activated or deactivated based on the set of GNSS bands so that the receiver is able to receive the set of GNSS bands.

Clause 17. An apparatus for providing Global Navigation Satellite System (GNSS) position fix information, the apparatus comprising: a data communication interface; a memory; and one or more processors communicatively coupled with the data communication interface and the memory, wherein the one or more processors are configured to: receive, via the data communication interface, a request for the GNSS position fix information, wherein the request includes an accuracy requirement; determine, from a plurality of GNSS bands available to a GNSS receiver, a set of GNSS bands to use to determine the GNSS position fix information based at least in part on the accuracy requirement; determine the GNSS position fix information based at least in part on GNSS signals received via the set of GNSS bands; and provide the GNSS position fix information with the data communication interface, wherein the GNSS position fix information comprises a GNSS position fix, pseudorange information, or both.

Clause 18. The apparatus of clause 17, wherein, to determine the set of GNSS bands to use based at least in part on the accuracy requirement, the one or more processors are configured to include, in the set of GNSS bands, two or more GNSS bands of the plurality of GNSS bands available to the GNSS receiver, responsive the accuracy requirement comprising a request for a maximum accuracy.

Clause 19. The apparatus of clause 17 wherein, to determine the set of GNSS bands to use based at least in part on the accuracy requirement, the one or more processors are configured to include, in the set of GNSS bands, a single GNSS band of the plurality of GNSS bands available to the GNSS receiver, responsive the accuracy requirement comprising an indication that no minimum accuracy is needed.

Clause 20. The apparatus of clause 17 wherein the one or more processors are configured to determine the set of GNSS bands to use based at least in part on a maximum allowable error estimate for the GNSS position fix information.

Clause 21. The apparatus of any one of clauses 17 or 19-20 wherein to determine the set of GNSS bands to use to determine the GNSS position fix information, the one or more processors are configured to: obtain initial GNSS position fix information using a single GNSS band; determine that an accuracy of the initial GNSS position fix information is insufficient to satisfy the accuracy requirement; and responsive to determining that the accuracy of the initial GNSS position fix information is insufficient to satisfy the accuracy requirement, include two or more GNSS bands in the set of bands.

Clause 22. The apparatus of any one of clauses 17-21 wherein to receive the request for the GNSS position fix, the one or more processors are configured to receive s a request for GNSS position fix information for a plurality of times; to determine the set of GNSS bands for the GNSS position fix information, the one or more processors are configured to determine two or more GNSS bands of the plurality of GNSS bands available to the GNSS receiver for first GNSS position fix information; to determine the GNSS position fix information, the one or more processors are configured to determine the first GNSS position fix information; to provide the GNSS position fix information, the one or more processors are configured to provide the first GNSS position fix information; and the one or more processors are configured to, responsive to a determination that the first GNSS position fix information satisfies the accuracy requirement for a first time of the plurality of times, obtain, for a second time of the plurality of times, second GNSS position fix information using a single GNSS band.

Clause 23. The apparatus of any one of clauses 17-22 wherein the one or more processors are further configured to, responsive to a determination that the second GNSS position fix information satisfies the accuracy requirement, obtain, for a third time of the plurality of times, third GNSS position fix information using the single GNSS band.

Clause 24. The apparatus of any one of clauses 17-23 wherein the one or more processors are further configured to, responsive to a determination that the second GNSS position fix information does not satisfy the accuracy requirement, obtain, for a third time of the plurality of times, third GNSS position fix information using the two or more GNSS bands used to determine the first GNSS position fix information.

Clause 25. The apparatus of any one of clauses 17-24 wherein to receive the request for the GNSS position fix information, the one or more processors are configured to receive the request for the GNSS position fix information from an application processor; and the one or more processors are further configured to provide the GNSS position fix information comprises providing the GNSS position fix information to the application processor.

Clause 26. The apparatus of any one of clauses 17-25 wherein, to determine the set of GNSS bands to use, the one or more processors are configured to include at least a baseline GNSS band in the set of GNSS bands.

Clause 27. The apparatus of clause 26 wherein the one or more processors are configured to select the Global Positioning System (GPS) L1 band as the baseline GNSS band.

Clause 28. The apparatus of any one of clauses 26-27 wherein, to determine the set of GNSS bands to use, the one or more processors are configured to include one or more additional GNSS bands in the set of GNSS bands.

Clause 29. The apparatus of clause 28 wherein the one or more processors are configured to select the GPS L5 band, the GPS L2 band, or both, as the one or more additional GNSS bands.

Clause 30. The apparatus of any one of clauses 17-29 wherein, to determine the set of GNSS bands to use, the one or more processors are configured to select the set of GNSS bands from the plurality of GNSS bands available to the GNSS receiver.

Clause 31. The apparatus of any one of clauses 17-30 wherein the apparatus comprises the GNSS receiver.

Clause 32. The apparatus of any one of clauses 17-31 where the GNSS receiver has a plurality of receiver chains, each receiver chain for receiving one or more GNSS bands of the of the plurality of GNSS bands, and wherein each receiver chain is selectively activated or deactivated based on the set of GNSS bands so that the receiver is able to receive the set of GNSS bands.

Clause 33. An apparatus for providing Global Navigation Satellite System (GNSS) position fix information, the apparatus comprising: means for receiving, at the apparatus, a request for the GNSS position fix information, wherein the request includes an accuracy requirement; means for determining, from a plurality of GNSS bands available to the apparatus, a set of GNSS bands to use to determine the GNSS position fix information based at least in part on the accuracy requirement; means for determining the GNSS position fix information based at least in part on GNSS signals received via the set of GNSS bands; and means for providing the GNSS position fix information, wherein the GNSS position fix information comprising a GNSS position fix, pseudorange information, or both.

Clause 34. The apparatus of clause 33, wherein the means for determining the set of GNSS bands to use comprise means for including two or more GNSS bands of the plurality of GNSS bands available to the apparatus in the set of GNSS bands responsive to the accuracy requirement comprising an indication that a maximum accuracy is requested.

Clause 35. The apparatus of clause 33 wherein the means for determining the set of GNSS bands to use comprise means for including a single GNSS band as the set of GNSS bands responsive to the accuracy requirement comprising an indication that no minimum accuracy is needed.

Clause 36. The apparatus of clause 33 wherein the means for determining a set of GNSS bands to use comprise means for determining the set of GNSS bands responsive to the accuracy requirement comprising a maximum allowable error estimate for the GNSS position fix information.

Clause 37. The apparatus of any one of clauses 33 or 35-36 wherein the means for determining the set of GNSS bands to use to determine the GNSS position fix information comprises: means for obtaining initial GNSS position fix information using a single GNSS band; means for determining that an accuracy of the initial GNSS position fix information is insufficient to satisfy the accuracy requirement; and means for determining two or more GNSS bands as the set of bands, responsive to determining that the accuracy of the initial GNSS position fix information is insufficient to satisfy the accuracy requirement.

Clause 38. The apparatus of any one of clauses 33-37 wherein the means for receiving the request for the GNSS position fix information comprises means for receiving a request for GNSS position fix information for a plurality of times; the means for determining the set of GNSS bands for the GNSS position fix information comprises means for determining two or more GNSS bands of the plurality of GNSS bands available to the apparatus for first GNSS position fix information; the means for determining the GNSS position fix information comprises means for determining the first GNSS position fix information; and means for means for providing the GNSS position fix information comprises means for providing the first GNSS position fix information; wherein the apparatus further comprises means for obtaining, for a second time of the plurality of times, second GNSS position fix information using a single GNSS band, responsive to a determination that the first GNSS position fix information satisfies the accuracy requirement for a first time of the plurality of times.

Clause 39. The apparatus of any one of clauses 33-38 wherein the apparatus further comprises means for obtaining, for a third time of the plurality of times, third GNSS position fix information using the single GNSS band, responsive to a determination that the second GNSS position fix information satisfies the accuracy requirement.

Clause 40. The apparatus of any one of clauses 33-39 wherein the apparatus further comprises means for obtaining, for a third time of the plurality of times, third GNSS position fix information using the two or more GNSS bands used to determine the first GNSS position fix information, responsive to a determination that the second GNSS position fix information does not satisfy the accuracy requirement.

Clause 41. The apparatus of any one of clauses 33-40 wherein the means for receiving the request for the GNSS position fix information comprises the means for receiving the request for the GNSS position fix information from an application processor; and the means for providing the GNSS position fix information comprises means for providing the GNSS position fix information to the application processor.

Clause 42. The apparatus of any one of clauses 33-41 wherein the means for determining the set of GNSS bands comprises means for including at least a baseline GNSS band in the set of GNSS bands.

Clause 43. The apparatus of any one of clauses 33-42 wherein the means for determining the set of GNSS bands comprises means for including one or more additional GNSS bands in the set of GNSS bands.

Clause 44. The apparatus of any one of clauses 33-43 wherein the means for determining the set of GNSS bands to use to determine the GNSS position fix information based at least in part on the accuracy requirement comprises means for selecting the set of GNSS bands from the plurality of GNSS bands available to the apparatus.

Clause 45. The apparatus of any one of clauses 33-44 wherein the apparatus comprises a GNSS receiver.

Clause 46. The method of any one of clauses 33-45 where the GNSS receiver has a plurality of receiver chains, each receiver chain for receiving one or more GNSS bands of the of the plurality of GNSS bands, and wherein each receiver chain is selectively activated or deactivated based on the set of GNSS bands so that the receiver is able to receive the set of GNSS bands.

Clause 47. A non-transitory computer-readable medium storing instructions for providing Global Navigation Satellite System (GNSS) position fix information, the instructions comprising code for: receiving a request for the GNSS position fix information, wherein the request includes an accuracy requirement; determine, from a plurality of GNSS bands available to a GNSS receiver, a set of GNSS bands to use to determine the GNSS position fix information based at least in part on the accuracy requirement; determining the GNSS position fix information based at least in part on GNSS signals received via the set of GNSS bands; and providing the GNSS position fix information, wherein the GNSS position fix information comprising a GNSS position fix, pseudorange information, or both.

Clause 48. The computer-readable medium of clause 47, wherein the code for determining the set of GNSS bands to use to determine the GNSS position fix information comprises code for: obtaining initial GNSS position fix information using a single GNSS band; determining that an accuracy of the initial GNSS position fix information is insufficient to satisfy the accuracy requirement; and determining two or more GNSS bands as the set of bands, responsive to determining that the accuracy of the initial GNSS position fix information is insufficient to satisfy the accuracy requirement.

Clause 49. The computer-readable medium of any one of clauses 47-48 wherein the code for receiving the request for the GNSS position fix information comprises code for receiving the request for the GNSS position fix information from an application processor; and the code for providing the GNSS position fix information comprises code for providing the GNSS position fix information to the application processor.

What is claimed is:

1. A method of providing Global Navigation Satellite System (GNSS) position fix information, the method comprising:
    receiving a request for the GNSS position fix information, wherein the request includes an accuracy requirement;
    determining, from a plurality of GNSS bands available to a GNSS receiver, a set of GNSS bands to use to determine the GNSS position fix information based at least in part on the accuracy requirement, wherein the GNSS receiver has a plurality of receiver chains, each receiver chain for receiving one or more GNSS bands of the of the plurality of GNSS bands, and wherein each receiver chain is selectively activated or deactivated based on the set of GNSS bands so that the GNSS receiver is able to receive the set of GNSS bands;
    determining the GNSS position fix information based at least in part on GNSS signals received via the set of GNSS bands; and
    providing the GNSS position fix information, wherein the GNSS position fix information comprises a GNSS position fix, pseudorange information, or both.

2. The method of claim 1, wherein:
    the accuracy requirement comprises an indication that a maximum accuracy is requested; and
    the set of GNSS bands comprises two or more GNSS bands of the plurality of GNSS bands available to the GNSS receiver.

3. The method of claim 1, wherein:
    the accuracy requirement comprises an indication that no minimum accuracy is needed; and
    the set of GNSS bands comprises a single GNSS band.

4. The method of claim 1, wherein the accuracy requirement comprises a maximum allowable error estimate for the GNSS position fix information.

5. The method of claim 1, wherein:
    determining the set of GNSS bands to use to determine the GNSS position fix information comprises:
        obtaining initial GNSS position fix information using a single GNSS band;
        determining that an accuracy of the initial GNSS position fix information is insufficient to satisfy the accuracy requirement; and responsive to determining that the accuracy of the initial GNSS position fix information is insufficient to satisfy the accuracy requirement, determining two or more GNSS bands as the set of GNSS bands.

6. The method of claim 1, wherein:
the request for the GNSS position fix information comprises a request for GNSS position fix information for a plurality of times;
determining the set of GNSS bands for the GNSS position fix information comprises determining two or more GNSS bands of the plurality of GNSS bands available to the GNSS receiver for first GNSS position fix information;
determining the GNSS position fix information comprises determining the first GNSS position fix information; and
providing the GNSS position fix information comprises providing the first GNSS position fix information;
wherein the method further comprises, responsive to a determination that the first GNSS position fix information satisfies the accuracy requirement for a first time of the plurality of times, obtaining, for a second time of the plurality of times, second GNSS position fix information using a single GNSS band.

7. The method of claim 6, wherein the method further comprises, responsive to a determination that the second GNSS position fix information satisfies the accuracy requirement, obtaining, for a third time of the plurality of times, third GNSS position fix information using the single GNSS band.

8. The method of claim 6, wherein the method further comprises, responsive to a determination that the second GNSS position fix information does not satisfy the accuracy requirement, obtaining, for a third time of the plurality of times, third GNSS position fix information using the two or more GNSS bands used to determine the first GNSS position fix information.

9. The method of claim 1, wherein:
receiving the request for the GNSS position fix information comprises receiving the request for the GNSS position fix information from an application processor; and
providing the GNSS position fix information comprises providing the GNSS position fix information to the application processor.

10. The method of claim 1, wherein the set of GNSS bands comprises at least a baseline GNSS band.

11. The method of claim 10, wherein the baseline GNSS band comprises the Global Positioning System (GPS) L1 band.

12. The method of claim 10, wherein the set of GNSS bands comprises one or more additional GNSS bands.

13. The method of claim 12, wherein the one or more additional GNSS bands comprise the GPS L5 band, the GPS L2 band, or both.

14. The method of claim 1, wherein determining the set of GNSS bands to use to determine the GNSS position fix information based at least in part on the accuracy requirement comprises selecting the set of GNSS bands from the plurality of GNSS bands available to the GNSS receiver.

15. The method of claim 1, wherein the GNSS receiver determines the GNSS position fix information and provides the GNSS position fix information.

16. An apparatus for providing Global Navigation Satellite System (GNSS) position fix information, the apparatus comprising:
a data communication interface;
a memory; and
one or more processors communicatively coupled with the data communication interface and the memory, wherein the one or more processors are configured to:
receive, via the data communication interface, a request for the GNSS position fix information, wherein the request includes an accuracy requirement;
determine, from a plurality of GNSS bands available to a GNSS receiver, a set of GNSS bands to use to determine the GNSS position fix information based at least in part on the accuracy requirement, wherein the GNSS receiver has a plurality of receiver chains, each receiver chain configured to receive one or more GNSS bands of the of the plurality of GNSS bands, and wherein each receiver chain is selectively activated or deactivated based on the set of GNSS bands so that the GNSS receiver is able to receive the set of GNSS bands;
determine the GNSS position fix information based at least in part on GNSS signals received via the set of GNSS bands; and
provide the GNSS position fix information with the data communication interface, wherein the GNSS position fix information comprises a GNSS position fix, pseudorange information, or both.

17. The apparatus of claim 16, wherein, to determine the set of GNSS bands to use based at least in part on the accuracy requirement, the one or more processors are configured to include, in the set of GNSS bands, two or more GNSS bands of the plurality of GNSS bands available to the GNSS receiver, responsive the accuracy requirement comprising a request for a maximum accuracy.

18. The apparatus of claim 16, wherein, to determine the set of GNSS bands to use based at least in part on the accuracy requirement, the one or more processors are configured to include, in the set of GNSS bands, a single GNSS band of the plurality of GNSS bands available to the GNSS receiver, responsive the accuracy requirement comprising an indication that no minimum accuracy is needed.

19. The apparatus of claim 16, wherein the one or more processors are configured to determine the set of GNSS bands to use based at least in part on a maximum allowable error estimate for the GNSS position fix information.

20. The apparatus of claim 16, wherein:
to determine the set of GNSS bands to use to determine the GNSS position fix information, the one or more processors are configured to:
obtain initial GNSS position fix information using a single GNSS band;
determine that an accuracy of the initial GNSS position fix information is insufficient to satisfy the accuracy requirement; and
responsive to determining that the accuracy of the initial GNSS position fix information is insufficient to satisfy the accuracy requirement, include two or more GNSS bands in the set of bands.

21. The apparatus of claim 16, wherein:
to receive the request for the GNSS position fix, the one or more processors are configured to receive s a request for GNSS position fix information for a plurality of times;
to determine the set of GNSS bands for the GNSS position fix information, the one or more processors are configured to determine two or more GNSS bands of the plurality of GNSS bands available to the GNSS receiver for first GNSS position fix information;

to determine the GNSS position fix information, the one or more processors are configured to determine the first GNSS position fix information;

to provide the GNSS position fix information, the one or more processors are configured to provide the first GNSS position fix information; and the one or more processors are configured to, responsive to a determination that the first GNSS position fix information satisfies the accuracy requirement for a first time of the plurality of times, obtain, for a second time of the plurality of times, second GNSS position fix information using a single GNSS band.

22. The apparatus of claim 21, wherein the one or more processors are further configured to, responsive to a determination that the second GNSS position fix information satisfies the accuracy requirement, obtain, for a third time of the plurality of times, third GNSS position fix information using the single GNSS band.

23. The apparatus of claim 21, wherein the one or more processors are further configured to, responsive to a determination that the second GNSS position fix information does not satisfy the accuracy requirement, obtain, for a third time of the plurality of times, third GNSS position fix information using the two or more GNSS bands used to determine the first GNSS position fix information.

24. The apparatus of claim 16, wherein:
to receive the request for the GNSS position fix information, the one or more processors are configured to receive the request for the GNSS position fix information from an application processor; and the one or more processors are further configured to provide the GNSS position fix information comprises providing the GNSS position fix information to the application processor.

25. The apparatus of claim 16, wherein, to determine the set of GNSS bands to use, the one or more processors are configured to include at least a baseline GNSS band in the set of GNSS bands.

26. The apparatus of claim 25, wherein the one or more processors are configured to select the Global Positioning System (GPS) L1 band as the baseline GNSS band.

27. The apparatus of claim 25, wherein, to determine the set of GNSS bands to use, the one or more processors are configured to include one or more additional GNSS bands in the set of GNSS bands.

28. The apparatus of claim 27, wherein the one or more processors are configured to select the GPS L5 band, the GPS L2 band, or both, as the one or more additional GNSS bands.

29. The apparatus of claim 16, wherein, to determine the set of GNSS bands to use, the one or more processors are configured to select the set of GNSS bands from the plurality of GNSS bands available to the GNSS receiver.

30. The apparatus of claim 16, wherein the apparatus comprises the GNSS receiver.

31. An apparatus for providing Global Navigation Satellite System (GNSS) position fix information, the apparatus comprising:
means for receiving, at the apparatus, a request for the GNSS position fix information, wherein the request includes an accuracy requirement;

means for determining, from a plurality of GNSS bands available to the apparatus, a set of GNSS bands to use to determine the GNSS position fix information based at least in part on the accuracy requirement, wherein the apparatus comprises a GNSS receiver, wherein the GNSS receiver has a plurality of receiver chains, each receiver chain for receiving one or more GNSS bands of the of the plurality of GNSS bands, and wherein each receiver chain is selectively activated or deactivated based on the set of GNSS bands so that the GNSS receiver is able to receive the set of GNSS bands;

means for determining the GNSS position fix information based at least in part on GNSS signals received via the set of GNSS bands; and means for providing the GNSS position fix information, wherein the GNSS position fix information comprising a GNSS position fix, pseudorange information, or both.

32. The apparatus of claim 31, wherein the means for determining the set of GNSS bands to use comprise means for including two or more GNSS bands of the plurality of GNSS bands available to the apparatus in the set of GNSS bands responsive to the accuracy requirement comprising an indication that a maximum accuracy is requested.

33. The apparatus of claim 31, wherein the means for determining the set of GNSS bands to use comprise means for including a single GNSS band as the set of GNSS bands responsive to the accuracy requirement comprising an indication that no minimum accuracy is needed.

34. The apparatus of claim 31, wherein the means for determining a set of GNSS bands to use comprise means for determining the set of GNSS bands responsive to the accuracy requirement comprising a maximum allowable error estimate for the GNSS position fix information.

35. The apparatus of claim 31, wherein the means for determining the set of GNSS bands to use to determine the GNSS position fix information comprises:
means for obtaining initial GNSS position fix information using a single GNSS band;

means for determining that an accuracy of the initial GNSS position fix information is insufficient to satisfy the accuracy requirement; and means for determining two or more GNSS bands as the set of bands, responsive to determining that the accuracy of the initial GNSS position fix information is insufficient to satisfy the accuracy requirement.

36. The apparatus of claim 31, wherein:
the means for receiving the request for the GNSS position fix information comprises means for receiving a request for GNSS position fix information for a plurality of times;

the means for determining the set of GNSS bands for the GNSS position fix information comprises means for determining two or more GNSS bands of the plurality of GNSS bands available to the apparatus for first GNSS position fix information;

the means for determining the GNSS position fix information comprises means for determining the first GNSS position fix information; and means for means for providing the GNSS position fix information comprises means for providing the first GNSS position fix information;

wherein the apparatus further comprises means for obtaining, for a second time of the plurality of times, second GNSS position fix information using a single GNSS band, responsive to a determination that the first GNSS position fix information satisfies the accuracy requirement for a first time of the plurality of times.

37. The apparatus of claim 36, wherein the apparatus further comprises means for obtaining, for a third time of the plurality of times, third GNSS position fix information using the single GNSS band, responsive to a determination that the second GNSS position fix information satisfies the accuracy requirement.

38. The apparatus of claim 36, wherein the apparatus further comprises means for obtaining, for a third time of the plurality of times, third GNSS position fix information using the two or more GNSS bands used to determine the first GNSS position fix information, responsive to a determination that the second GNSS position fix information does not satisfy the accuracy requirement.

39. The apparatus of claim 31, wherein:
the means for receiving the request for the GNSS position fix information comprises the means for receiving the request for the GNSS position fix information from an application processor; and
the means for providing the GNSS position fix information comprises means for providing the GNSS position fix information to the application processor.

40. The apparatus of claim 31, wherein the means for determining the set of GNSS bands comprises means for including at least a baseline GNSS band in the set of GNSS bands.

41. The apparatus of claim 40, wherein the means for determining the set of GNSS bands comprises means for including one or more additional GNSS bands in the set of GNSS bands.

42. The apparatus of claim 31, wherein the means for determining the set of GNSS bands to use to determine the GNSS position fix information based at least in part on the accuracy requirement comprises means for selecting the set of GNSS bands from the plurality of GNSS bands available to the apparatus.

43. A non-transitory computer-readable medium storing instructions for providing Global Navigation Satellite System (GNSS) position fix information, the instructions comprising code for:
receiving a request for the GNSS position fix information, wherein the request includes an accuracy requirement;
determine, from a plurality of GNSS bands available to a GNSS receiver, a set of GNSS bands to use to determine the GNSS position fix information based at least in part on the accuracy requirement, wherein the GNSS receiver has a plurality of receiver chains, each receiver chain for receiving one or more GNSS bands of the of the plurality of GNSS bands, and wherein each receiver chain is selectively activated or deactivated based on the set of GNSS bands so that the GNSS receiver is able to receive the set of GNSS bands;
determining the GNSS position fix information based at least in part on GNSS signals received via the set of GNSS bands; and
providing the GNSS position fix information, wherein the GNSS position fix information comprising a GNSS position fix, pseudorange information, or both.

44. The computer-readable medium of claim 43, wherein the code for determining the set of GNSS bands to use to determine the GNSS position fix information comprises code for:
obtaining initial GNSS position fix information using a single GNSS band;
determining that an accuracy of the initial GNSS position fix information is insufficient to satisfy the accuracy requirement; and
determining two or more GNSS bands as the set of bands, responsive to determining that the accuracy of the initial GNSS position fix information is insufficient to satisfy the accuracy requirement.

45. The computer-readable medium of claim 43, wherein:
the code for receiving the request for the GNSS position fix information comprises code for receiving the request for the GNSS position fix information from an application processor; and
the code for providing the GNSS position fix information comprises code for providing the GNSS position fix information to the application processor.

* * * * *